(12) United States Patent
Kono

(10) Patent No.: US 9,124,779 B2
(45) Date of Patent: Sep. 1, 2015

(54) TRANSMISSION APPARATUS AND TRANSMISSION METHOD

(75) Inventor: Akihiro Kono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 13/090,720

(22) Filed: Apr. 20, 2011

(65) Prior Publication Data

US 2011/0317011 A1 Dec. 29, 2011

(30) Foreign Application Priority Data

Jun. 23, 2010 (JP) ................................. 2010-142946

(51) Int. Cl.
H04N 7/18 (2006.01)
(52) U.S. Cl.
CPC ..................................... H04N 7/183 (2013.01)
(58) Field of Classification Search
CPC ............................... H04N 7/183; H04N 5/232
USPC ......................................................... 348/143
See application file for complete search history.

(56) References Cited

U.S. PATENT DOCUMENTS

| | | | | |
|---|---|---|---|---|
| 6,392,693 B1 * | 5/2002 | Wakiyama et al. | ............ | 348/143 |
| 6,977,678 B1 * | 12/2005 | Wada et al. | .............. | 348/211.99 |
| 7,298,400 B2 * | 11/2007 | Taguchi | ...................... | 348/211.8 |
| 7,310,111 B2 * | 12/2007 | Ramirez-Diaz et al. | ...... | 348/159 |
| 7,817,201 B2 * | 10/2010 | Shmizu et al. | ............ | 348/333.01 |
| 8,102,423 B2 * | 1/2012 | Cheng | ........................... | 348/159 |
| 2003/0202101 A1 * | 10/2003 | Monroe et al. | ................ | 348/156 |
| 2006/0114322 A1 * | 6/2006 | Romanowich et al. | ........ | 348/143 |
| 2008/0158355 A1 * | 7/2008 | Jodan et al. | .................... | 348/143 |
| 2010/0002071 A1 * | 1/2010 | Ahiska | ............................ | 348/36 |

FOREIGN PATENT DOCUMENTS

| | | |
|---|---|---|
| JP | 04-248790 A | 9/1992 |
| JP | 2001-69496 A | 3/2001 |
| JP | 2007-013278 A | 1/2007 |
| JP | 2007-089042 A | 4/2007 |
| JP | 2007-114503 A | 5/2007 |
| WO | WO 2007/147171 A2 * | 12/2007 ................ G06T 7/20 |

* cited by examiner

*Primary Examiner* — Tat Chio
*Assistant Examiner* — Nguyen Truong
(74) *Attorney, Agent, or Firm* — Canon U.S.A., Inc. IP Division

(57) ABSTRACT

A first control unit of a transmission apparatus controls pan, tilt, and rotation mechanisms according to a movement direction indicated by a movement instruction for changing an imaging direction of an imaging unit. A second control unit of the transmission apparatus performs control so as to prevent transmission of captured image data captured during the control of the pan, tilt, and rotation mechanisms, during the control performed by the first control unit.

19 Claims, 16 Drawing Sheets

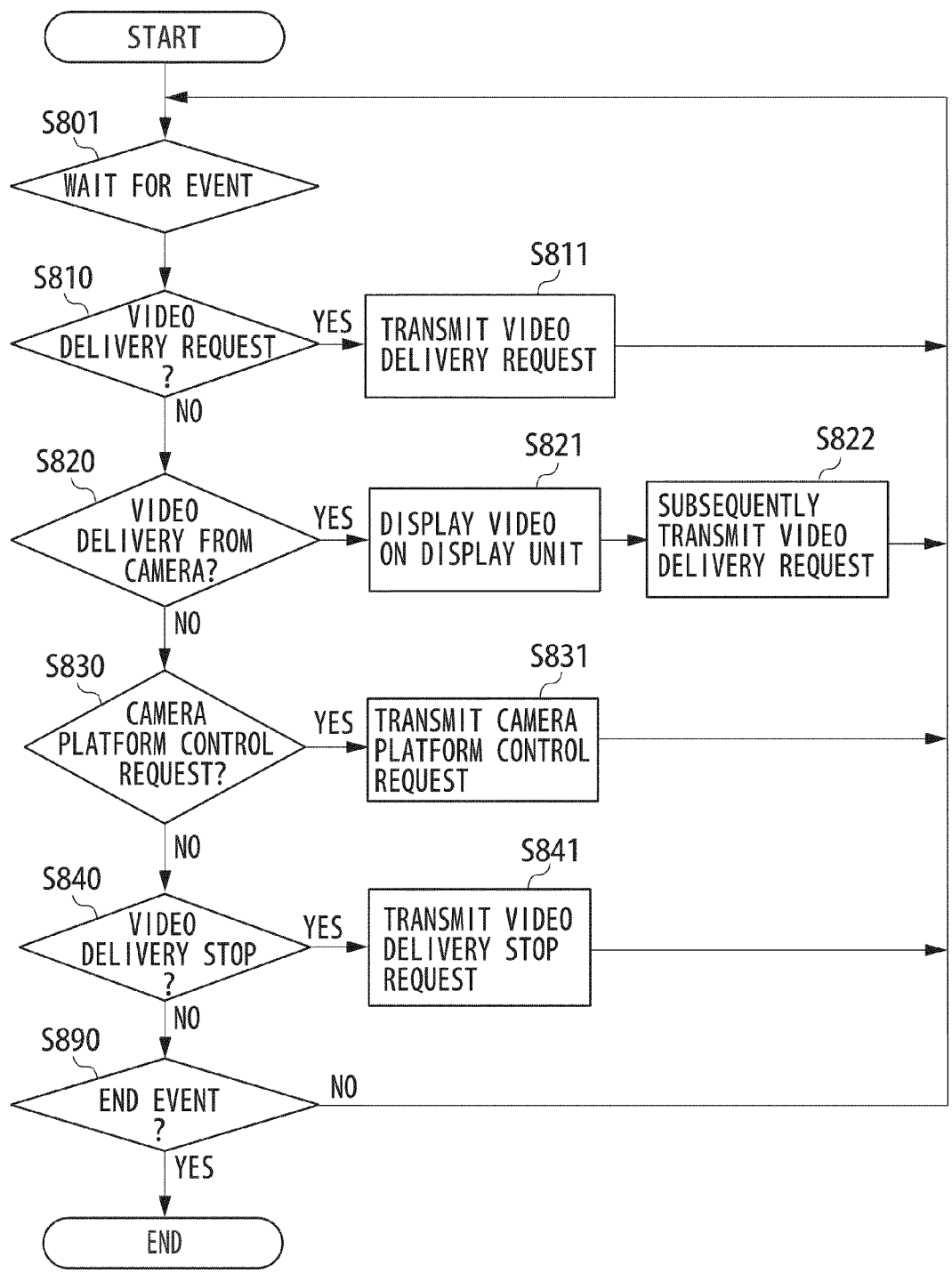

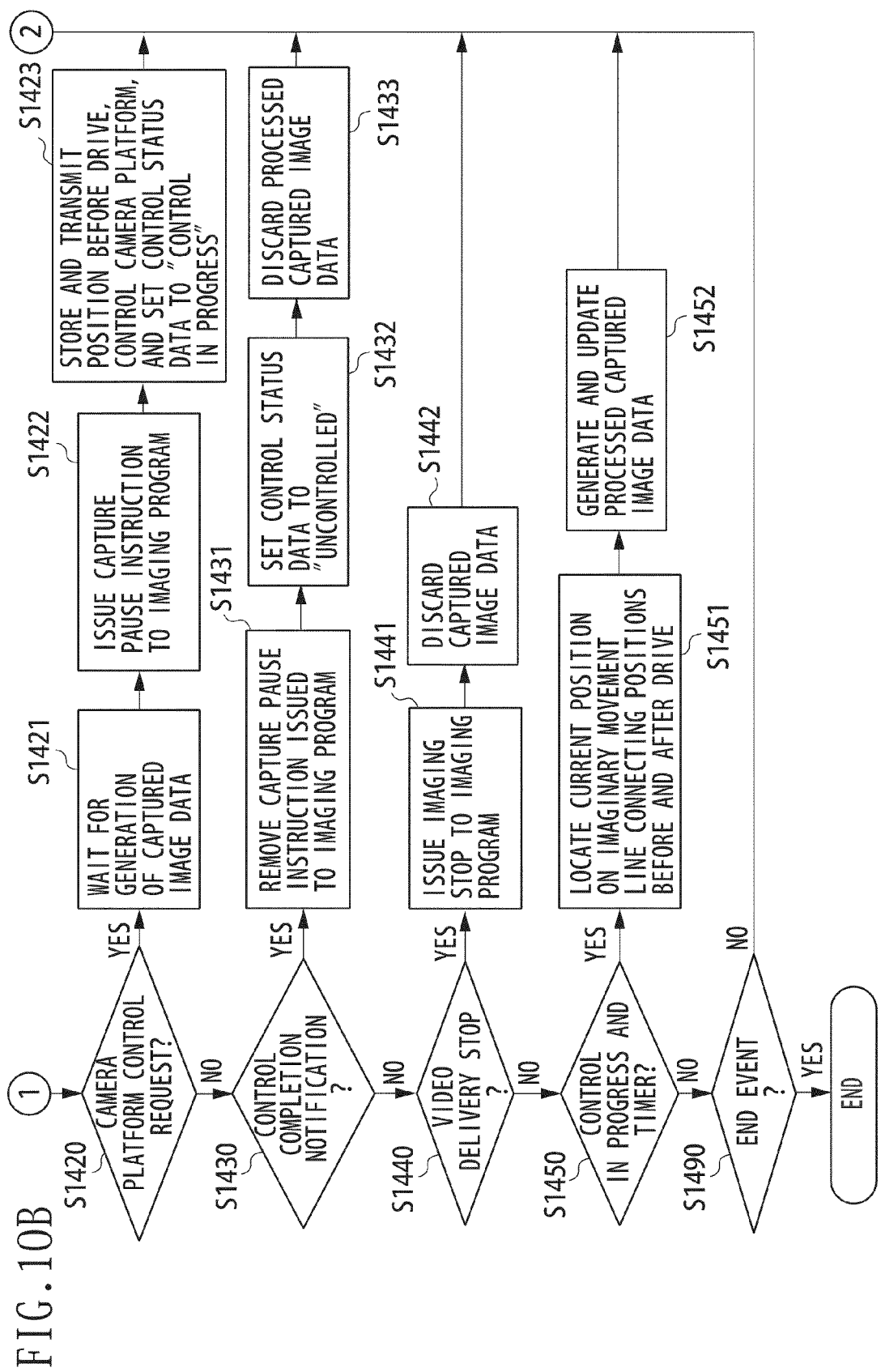

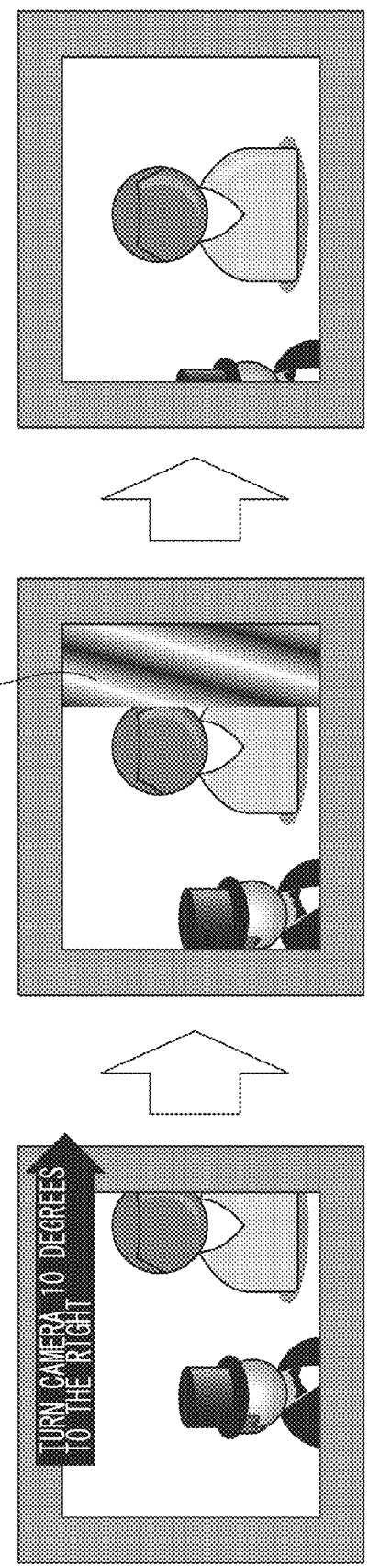

TRANSMISSION APPARATUS AND TRANSMISSION METHOD

BACKGROUND OF THE INVENTION

1. Field of the Invention

The present invention relates to a transmission apparatus capable of transmitting captured image data captured by an imaging unit, and a display control apparatus capable of receiving and displaying the captured image data from the transmission apparatus.

2. Description of the Related Art

Conventionally, there has been known a remote control technique for controlling an imaging direction of a network camera provided with a pan mechanism and a tilt mechanism. For example, Japanese Patent Application Laid-Open No. 2001-69496 discusses that a user remote-controls from a controller 12 the imaging direction of a monitoring camera capable of being endlessly rotated by 360 degrees in a pan direction and being rotated by 180 degrees in a tilt direction.

Further, Japanese Patent Application Laid-Open No. 2007-114503 discusses that a camera platform control apparatus remote-controls the driving of a pan mechanism and a tilt mechanism of a camera platform with an imaging apparatus mounted thereon, or the driving an optical axis rotation of the imaging apparatus.

However, a certain instruction for moving the imaging direction may mislead a user to think that the imaging direction is not appropriately controlled in response to the user's movement instruction.

A more specific example of this case will be described below with reference to FIG. 12. A camera illustrated in FIG. 12 includes a pan mechanism 1601, a tilt mechanism 1602, and a rotation mechanism 1603 capable of being driven by a movement instruction transmitted from a remote site. As illustrated in FIG. 12, the pan mechanism 1601 and the tilt mechanism 1602 each can move only within a limited range.

Further, in the example illustrated in FIG. 12, the pan mechanism causes a rotation of the imaging unit when the pan mechanism changes the imaging direction of the imaging unit, while the tilt mechanism does not cause a rotation of the imaging unit when the tilt mechanism changes the imaging direction of the imaging unit. In this case, the camera may combine driving the pan mechanism, the tilt mechanism, and the rotation mechanism, depending on a movement direction instructed by a user.

For example, it is assumed that a user is viewing a reproduced image based on captured image data transmitted from the camera illustrated in FIG. 12, and then this user inputs a movement instruction to the camera for changing the imaging direction by 10 degrees to the right. The right direction as viewed in FIG. 12 is a different direction from the direction to which the imaging direction can be moved by driving the tilt mechanism 1602. Therefore, for moving the imaging direction to the right, the camera has to control not only the tilt mechanism, which does not cause a rotation of the imaging unit, but also the pan mechanism, which causes a rotation of the imaging unit.

More specifically, referring to FIG. 13, the camera drives the tilt mechanism to move the imaging direction by 10 degrees downward as indicated by the instruction "1" in FIG. 13, and then drives the pan mechanism by 90 degrees as indicated by the instruction "2". These two control operations result in a movement of the imaging direction of the camera by 10 degrees to the right. However, as indicated by "HOW OBJECT LOOKS ACTUALLY", the control of the pan mechanism results in a rotation of the displayed image, and therefore the camera further controls the rotation mechanism.

When the camera respectively controls the pan mechanism, the tilt mechanism, and the rotation mechanism in this way according to the movement instruction for moving the imaging direction to the right, the user may misunderstand the situation and tends to think that the camera is not performing an appropriate control in response to the user's imaging direction movement instruction.

SUMMARY OF THE INVENTION

The present invention is directed to a transmission apparatus and a transmission method capable of reducing the possibility that a user may think that the camera is not performing an appropriate control in response to the user's imaging direction movement instruction.

According to an aspect of the present invention, a transmission apparatus, which is configured to transmit captured image data that is captured by an imaging unit, includes a direction change mechanism for changing an imaging direction of the imaging unit, a rotation mechanism for rotating the imaging unit, a first control unit configured to control the direction change mechanism and the rotation mechanism according to a movement direction indicated by an instruction to move the imaging direction of the imaging unit, and a second control unit configured to perform control so as to prevent a transmission destination from displaying an image based on the captured image data that is captured by the imaging unit during the control by the first control unit according to the movement direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating an operation of the client 200.

FIG. 11 illustrates an example of generated processed images.

DESCRIPTION OF THE EMBODIMENTS

Various exemplary embodiments, features, and aspects of the invention will be described in detail below with reference to the drawings.

Figure 3:
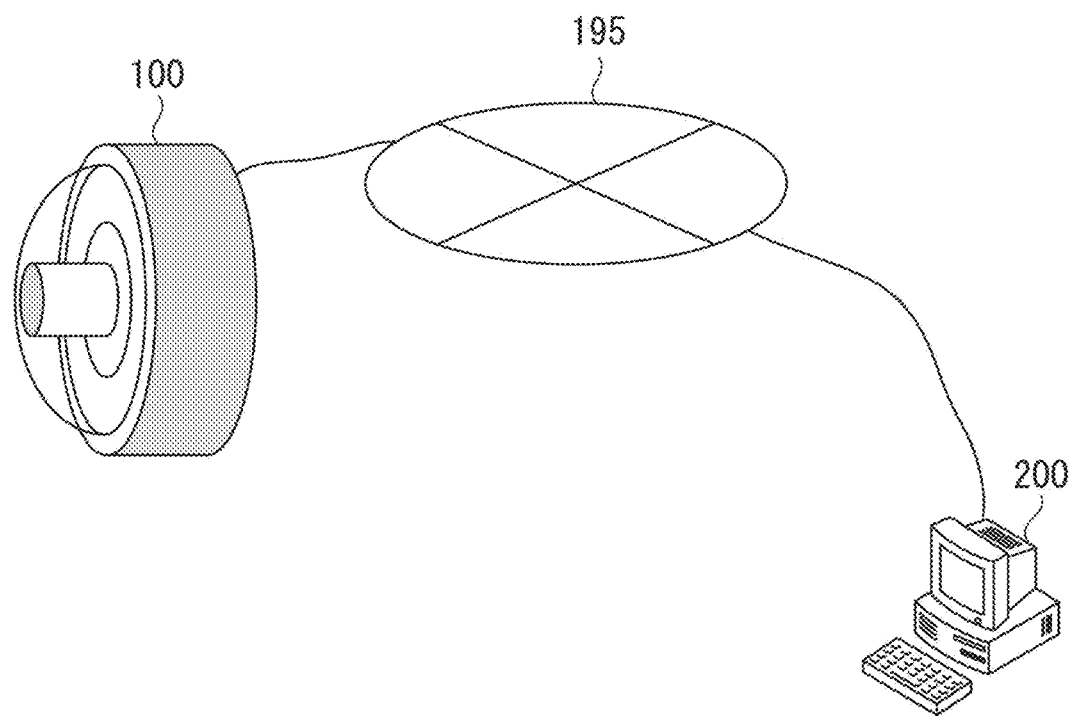
FIG. 3 illustrates a configuration of a system.

FIG. 3 illustrates an example of a configuration of an overall system according to a first exemplary embodiment. A viewer client 200 (hereinafter referred to as "client 200") is connected to a camera server 100 via a network 195. The camera server 100 in the present exemplary embodiment is a transmission apparatus which transmits captured image data to the client 200.

Further, while the camera server 100 is controlling a pan mechanism, a tilt mechanism, and/or a rotational mechanism for changing the imaging direction, the camera server 100 transmits pre-control image data that is captured before this control to the client 200. Further, the client 200 in the present exemplary embodiment is a display control apparatus for displaying an image based on captured image data (or pre-control image data) received from the camera server 100.

Figure 1:
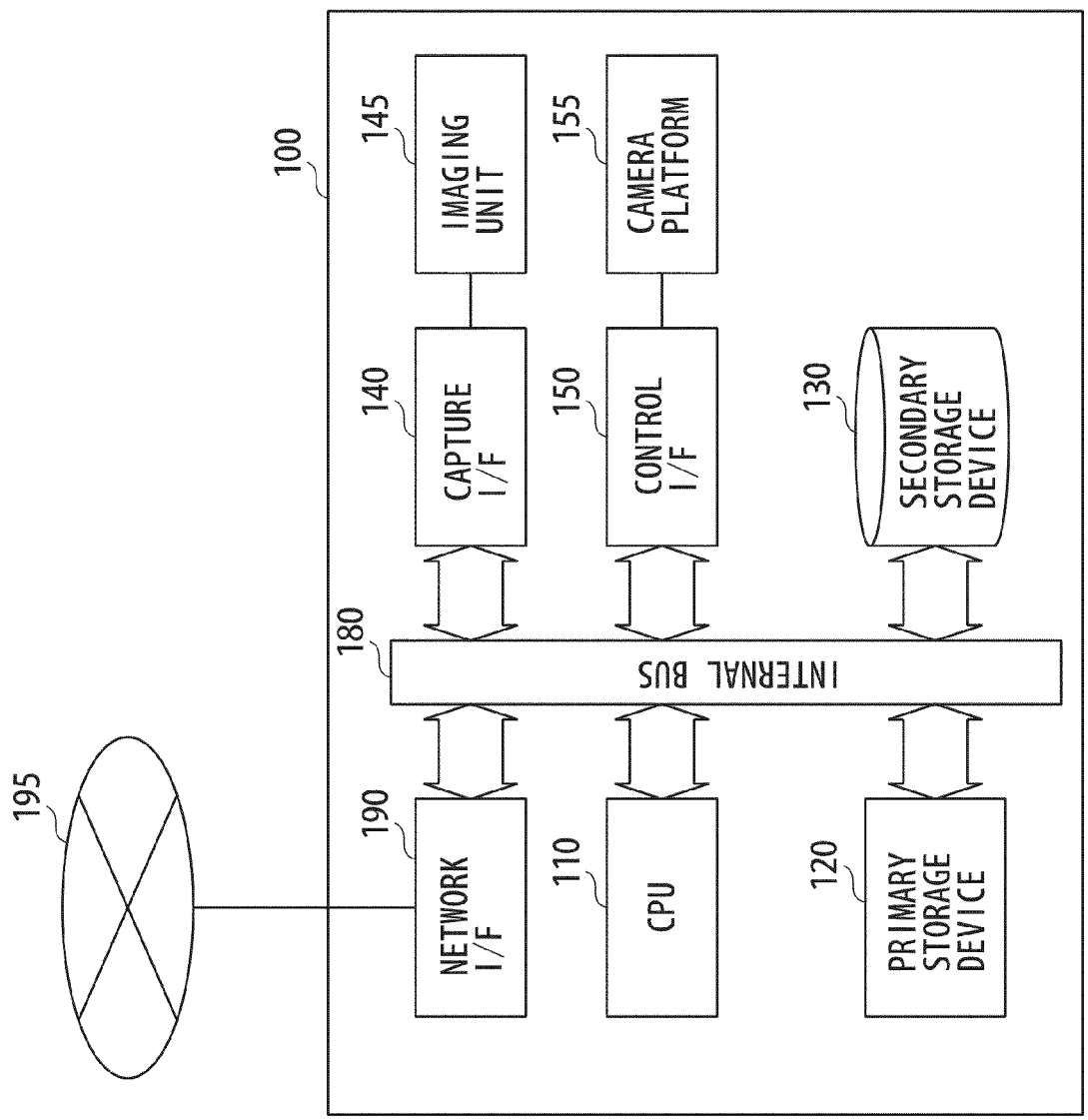
FIG. 1 is a block diagram illustrating a configuration of a camera server 100.

FIG. 1 is a block diagram illustrating a configuration of the camera server 100 which is a transmission apparatus. The camera server 100 in the present exemplary embodiment includes a central processing unit (CPU) 110, a primary storage device 120, a secondary storage device 130, a capture interface (I/F) 140, a pan/tilt/rotation control I/F 150, and a network I/F 190.

The primary storage device 120 is a high-speed writable storage device such as a random access memory (RAM). The primary storage device 120 is used as an area in which an operating system (OS), various programs, and various data are loaded, and as a working area for the OS and the various programs. The same applies to a primary storage device 220 of the client 200 illustrated in FIG. 2, which will be described later.

The secondary storage device 130 is a non-volatile storage device such as a floppy disk drive (FDD), a hard disk drive (HDD), a flash memory, or a compact disc read only memory (CD-ROM) drive. The secondary storage device 130 is used as a storage area permanently storing the OS, the various programs, and the various data, and as a storage area temporarily storing various data. The same applies to a secondary storage device 230 of the client 200 illustrated in FIG. 2, which will be described later.

The capture I/F 140, to which an imaging unit 145 is connected, converts and compresses image data obtained by the imaging unit 145 into a predetermined format, and a transfer of the resulting captured image data to the secondary storage device 130.

The control I/F 150, to which a camera platform 155 is connected, detects control statuses of a pan mechanism, a tilt mechanism, and a rotation mechanism of the camera platform 155, and controls the mechanisms according to an imaging direction movement instruction (camera platform control request).

Figure 14:
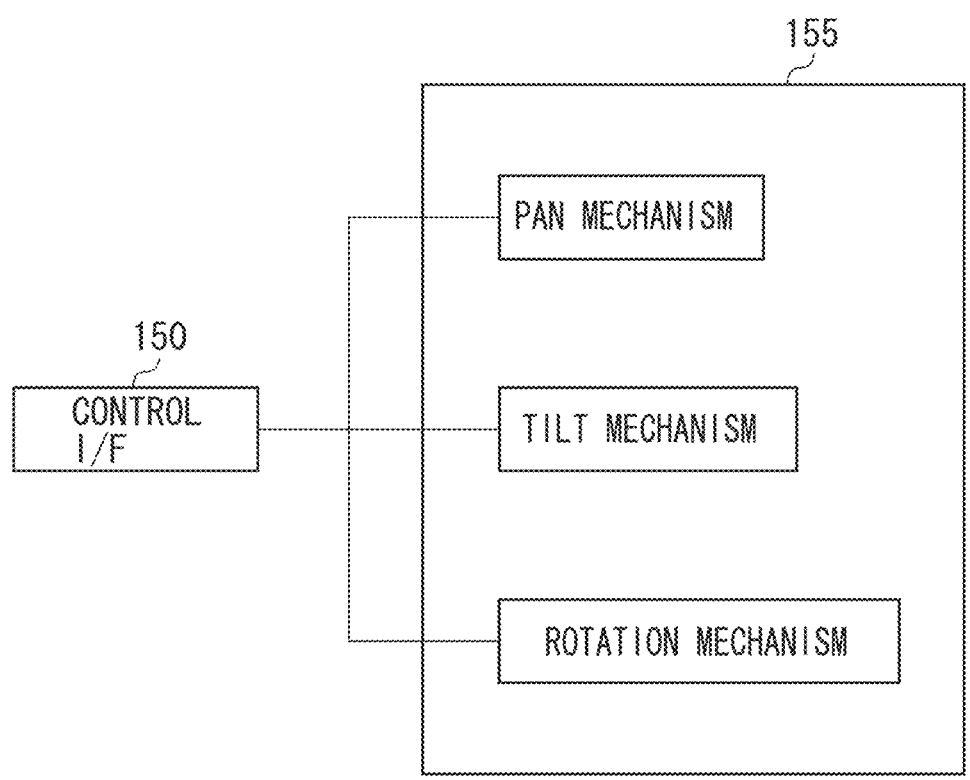
FIG. 14 illustrates an example of a configuration of a camera platform 155.

FIG. 14 is a block diagram illustrating details of the camera platform 155. As illustrated in FIG. 14, the camera platform 155 includes the pan mechanism, the tilt mechanism, and the rotation mechanism.

The network I/F 190 is an I/F for connecting the camera server 100 to the network 195. Date exchanged between the camera server 100 and the client 200 is transmitted and received via the network I/F 190.

The network 195 is a network constituted by, for example, a plurality of routers, switches, and cables in compliance with a communication standard such as Ethernet (registered trademark). The network 195 may be realized by any communication standard, scale, and configuration enabling communication between the server and client without any problem. The network 195 is, for example, the Internet or a local area network (LAN).

Figure 12:
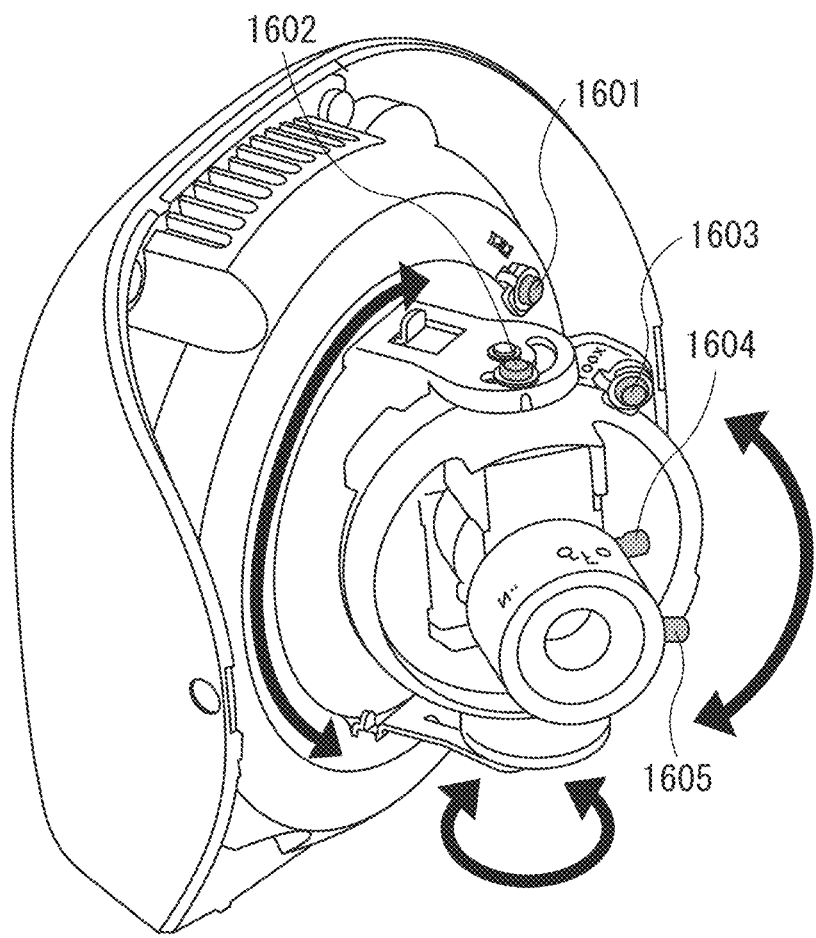
FIG. 12 illustrates an example of a structure of a camera.

Next, a structure of the camera server 100 according to the present exemplary embodiment will be described with reference to FIG. 12. As illustrated in FIG. 12, the camera server 100 includes the pan mechanism 1601, the tilt mechanism 1602, and the rotation mechanism 1603. As indicated by arrows in FIG. 12, the pan mechanism 1601 and the tilt mechanism 1602 can be driven in only respective determined directions.

Further, the pan mechanism 1601 is a mechanism that causes a rotation of the imaging unit 145 when the pan mechanism 1601 changes the imaging direction of the imaging unit 145. On the other hand, the tilt mechanism 1602 is a mechanism that does not cause a rotation of the imaging unit 145 when the tilt mechanism 1602 changes the imaging direction of the imaging unit 145. In this way, the camera server 100 includes the tilt mechanism for changing the imaging direction of the imaging unit 145 to a first movement direction (tilt direction) without causing a rotation of the imaging unit 145, and the pan mechanism for changing the imaging direction of the imaging unit 145 to a second movement direction (pan direction) while causing a rotation of the imaging unit 145.

In other words, the camera server 100 includes a plurality of direction changing mechanisms (the pan mechanism 1601 and the tilt mechanism 1602) for changing the imaging direction of the imaging unit 145. In addition, the camera server 100 includes a rotation mechanism (the rotation mechanism 1603) for rotating the imaging unit 145 without moving the imaging direction of the imaging unit 145.

Further, when the movement direction according to a movement instruction of the imaging direction of the imaging unit 145 coincides with the tilt direction, the camera server 100 controls the tilt mechanism 1602 so as to change the imaging direction of the imaging unit 145 according to the movement instruction without causing a rotation of the imaging unit 145.

On the other hand, when the movement direction according to a movement instruction does not coincide with the tilt direction, the camera server 100 controls the pan mechanism 1601 and the tilt mechanism 1602, and also controls the rotation mechanism 1603 so that an image displayed on the client 200 is not rotated after the control of the pan mechanism 1601 and the tilt mechanism 1602 relative to the image before this control.

Figure 13:
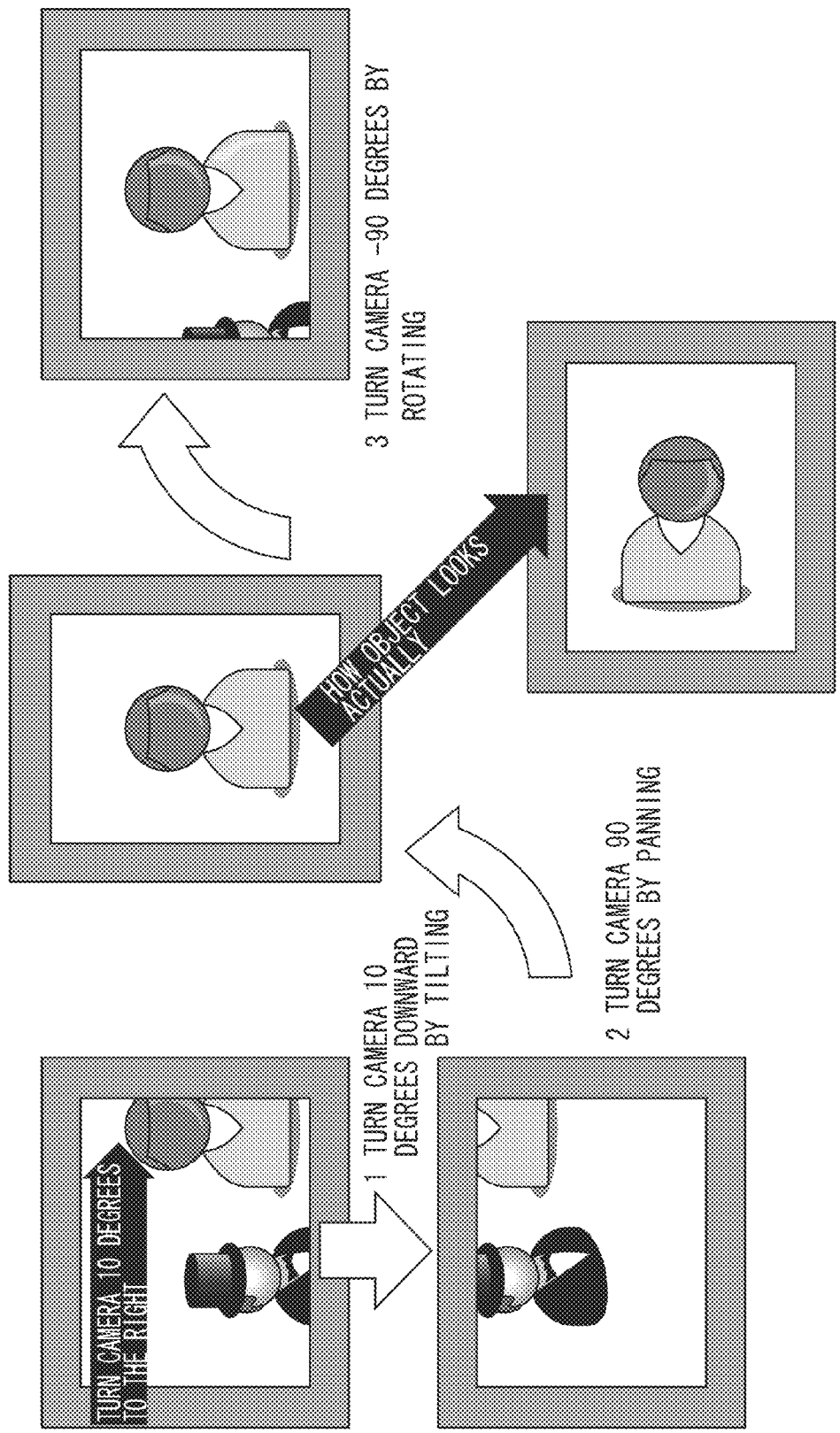
FIG. 13 illustrates an example of images displayed as a result of operation of the camera.

For example, as illustrated in FIG. 13, in response to an input of a movement instruction at the client 200 for moving the imaging direction of the imaging unit 145 by 10 degrees to the right, the camera server 100 drives the tilt mechanism 1602 by 10 degrees downward, and then drives the pan mechanism 1601 by 90 degrees. After that, the camera server 100 drives the rotation mechanism 1603 by −90 degrees so that an image displayed on the client 200 is not rotated after the control of the pan mechanism 1601 and the tilt mechanism 1602 relative to the image before this control.

However, the pan mechanism 1601, the tilt mechanism 1602, and the rotation mechanism 1603 may be controlled in any order. Further, in the present exemplary embodiment, it is assumed that the right direction is different from the tilt direction. However, the right direction may coincide with the tilt direction, depending on the driven status of the pan mechanism 1601.

Further, an imaging program, a control program, and a delivery program are loaded on the primary storage device 120 of the camera server 100 in the present exemplary embodiment. Further, for example, control status data and captured image data are stored in the secondary storage device 130 of the camera server 100.

The imaging program is a program which causes the video capture I/F 140 to convert/compress image data captured by the imaging unit 145 into a predetermined format, and then causes the secondary storage device 130 to store the resulting data. The storage destination is not limited to the secondary storage device 130, and the data may be stored in, for example, the primary storage device 120 or a buffer.

The control program is a program which controls the pan mechanism 1601, the tilt mechanism 1602, and the rotation mechanism 1603 of the camera platform 155 according to a movement instruction (camera platform control request) to move the imaging direction of the imaging unit 145, and notifies the client 200 of a control status.

The delivery program is a program which instructs the imaging program to start an imaging operation in response to a video delivery request transmitted from the client 200, and delivers the obtained captured image data to the client 200. The delivery program is also a program which causes the control program to control the camera platform 155 according to an imaging direction movement instruction (camera platform control request) transmitted from the client 200. The details of the delivery program will be described below with reference to FIG. 5.

Figure 2:
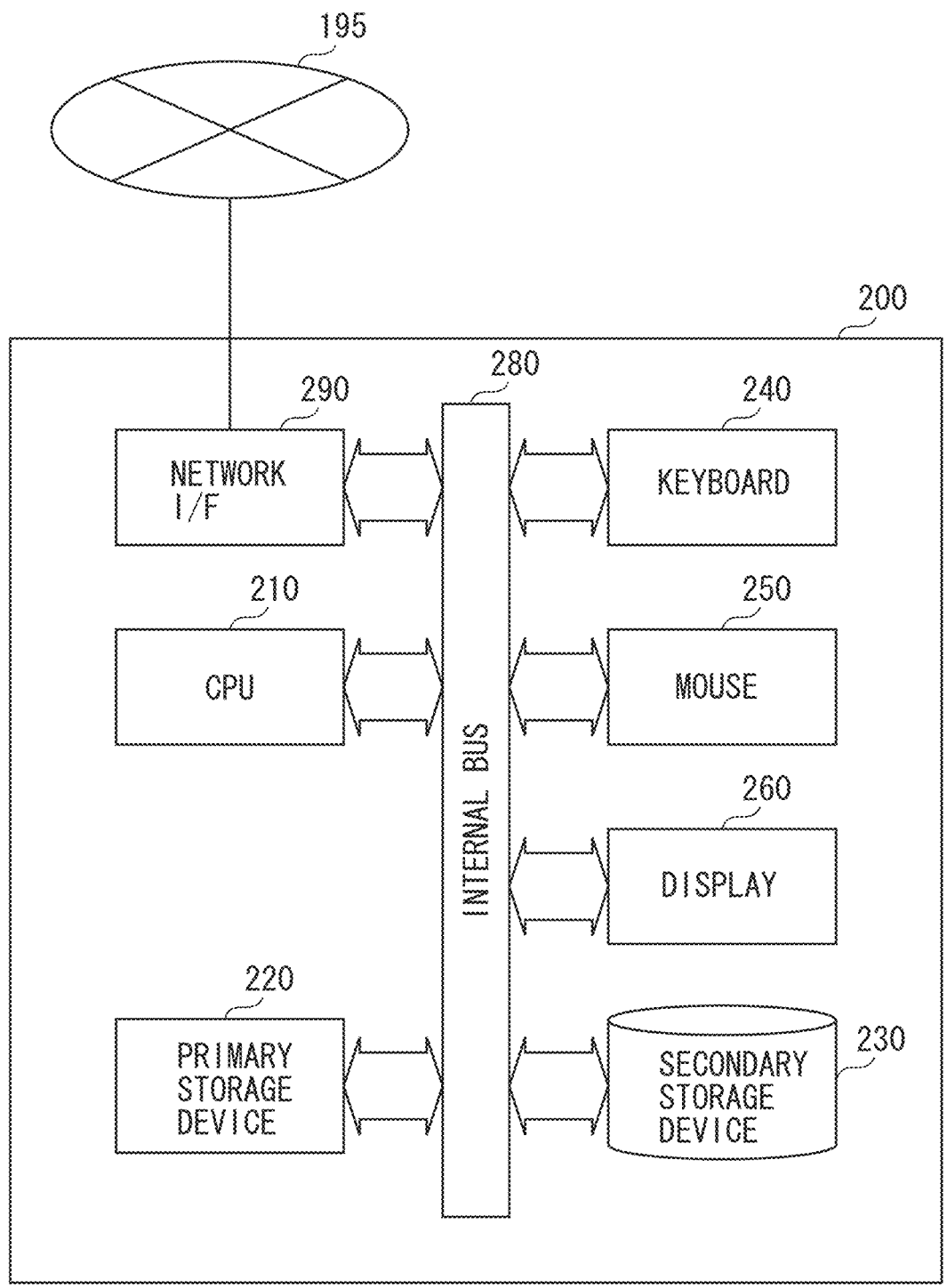
FIG. 2 is a block diagram illustrating a configuration of a client 200.

FIG. 2 is a block diagram illustrating a configuration of the client 200, which is a display control apparatus.

The client 200 in the present exemplary embodiment includes a CPU 210, the primary storage device 220, the secondary storage device 230, a keyboard 240, a mouse 250, a display 260, and a network I/F 290.

The keyboard 240 and the mouse 250 constitutes an input unit to which an instruction is input by a user. More specifically, a user of the client 200 inputs a request for transmitting captured image data of the camera sever 100 and a request for changing the imaging direction of the camera server 100 by using the keyboard 240 or the mouse 250. However, the input unit is not limited to the keyboard 240 and the mouse 250.

The display 260 displays an image based on captured image data transmitted from the camera server 100. The network I/F 290 is an I/F for connecting the camera server 100 to the network 195. Data exchanged between the client 200 and the camera server 100 is transmitted and received via the network I/F 290.

In the present exemplary embodiment, a display program is loaded onto the primary storage device 220 of the client 200. Further, for example, pre-control image data and captured image data are stored in the secondary storage device 230 of the client 200.

The display program is a program which transmits a request for captured image data (video delivery request) to the camera server 100, and displays an image based on the captured image data transmitted from the camera server 100. The details of the display program will be described below with reference to FIG. 6.

The captured image data is transmitted from the camera server 100, and the pre-control image data is, among the captured image data transmitted from the camera server 100, captured before control of the mechanisms according to an imaging direction movement instruction. In this way, the client 200 stores the captured image data and the pre-control image data separately.

As illustrated in FIG. 3, in the overall system configuration according to the present exemplary embodiment, the camera server 100, which is configured to be driven around three axes, i.e., pan, tilt, and rotation axes, is connected to the client 200 via the network 195. The camera platform 155 is controlled via the network 195 by an instruction entered from the input unit of the client 200 such as the keyboard 240 and the mouse 250.

Further, an image based on captured image data that is captured by the imaging unit 145 of the camera server 100 is displayed on the display 260 of the client 200.

Next, an operation of the camera sever 100, which is a transmission apparatus in the present exemplary embodiment, will be described with reference to the flowchart illustrated in FIG. 5 (5A and 5B). As the present exemplary embodiment, the operation will be described based on an example in which the central processing unit (CPU) 110 of the camera server 100 performs the processing. However, for example, a part of the processing may be performed by dedicated hardware.

In step S701, the CPU 110 waits for an occurrence of an event. When an event occurs, the processing proceeds to step S710. In step S710, the CPU 110 determines whether the event that has occurred in step S701 is a reception of a video delivery request from the client 200. The video delivery request is a request for captured image data. If the CPU 110 determines that the event is a reception of a video delivery request (YES in step S710), the processing proceeds to step S711. If the CPU 110 determines that the event is not a reception of a video delivery request (NO in step S710), the processing proceeds to step S720.

In step S711, the CPU 110 determines whether the imaging unit 145 is already capturing an image. If the CPU 110 determines that the imaging unit 145 is capturing an image (YES in step S711), the processing proceeds to step S712. If the CPU 110 determines that the imaging unit 145 is not capturing an image (NO in step S711), the processing proceeds to step 715.

In step S712, the CPU 110 transmits the captured image data to the client 200 via the network I/F 190. After the CPU 110 transmits the captured image data, the processing returns to step S701.

In step S715, the CPU 110 determines whether the imaging direction of the imaging unit 145 is being controlled. If the CPU 110 determines that the imaging direction of the imaging unit 145 is being controlled (YES in step S715), the processing proceeds to step S712. If the CPU 110 determines that the imaging direction of the imaging unit 145 is not being controlled (NO in step S715), the processing proceeds to step S716.

If the CPU 110 determines in step S715 that the imaging direction of the imaging unit 145 is being controlled, in step 712, the CPU 110 transmits, to the client 200, pre-control image data that is captured before the control. More specifically, the CPU 110 performs control so as not to transmit captured image data that is captured during the control of the pan, tilt, and rotation mechanisms 1601, 1602, and 1603 according to an imaging direction movement instruction.

This arrangement can reduce the possibility that a user may misunderstand the situation and think that the camera server 100 is not applying appropriate control in response to the user's imaging direction movement instruction.

In step S716, the CPU 110 issues an image capturing start instruction to the imaging program, which then causes the imaging unit 145 to start an image capturing operation. Alternatively, for example, the camera server 100 may be configured in such a manner that the imaging unit 145 starts an image capturing operation upon a start-up of the camera server 100. In this case, new captured image data may be overwritten and stored onto an area storing previously captured image data.

In step S720, the CPU 110 determines whether the event that has occurred in step S701 is a reception of a camera platform control request (movement instruction) from the client 200. The camera platform control request is a request for changing the imaging direction of the imaging unit 145. If the CPU 110 determines that the event is a reception of a camera platform control request (YES in step S720), the processing proceeds to step S721. If the CPU 110 determines that the event is not a reception of a camera platform control request (NO in step S720), the processing proceeds to step S730.

In step S721, the CPU 110 generates captured image data. The captured image data generated at this time is stored as pre-control image data separately from other captured image data. After the CPU 110 generates the captured image data, the processing proceeds to step S722. In step S722, the CPU 110 causes the imaging unit 145 to pause the image capturing operation.

More specifically, in step S722 (second control process), the CPU 110 controls the imaging unit 145 so that the client 200 does not display captured image data that the imaging unit 145 captures while the pan, tilt, and rotation mechanisms 1601, 1602, and 1603 are being controlled according to the imaging direction movement instruction.

The present exemplary embodiment is described based on an example of controlling the imaging unit 145 so as not to capture an image at this time. However, for example, the CPU 110 may perform control so as to prevent transmission of captured image data that the imaging unit 145 captures at this time.

In step S723 (first control process), the CPU 110 starts to control the camera platform 155 via the control I/F 150, and sets the control status data to "CONTROL IN PROGRESS", and then the processing returns to step S701. In other words, in step S723, the CPU 110 controls the imaging unit 145 to the movement direction according to the imaging direction movement instruction.

More specifically, if the movement direction according to the movement instruction coincides with the tilt direction, the CPU 110 controls the imaging direction of the imaging unit 145 without causing a rotation of the imaging unit 145 by controlling the tilt mechanism 1602. On the other hand, if the movement direction according to the movement instruction does not coincide with the tilt direction, the CPU 110 controls the pan and tilt mechanisms 1601 and 1602.

Furthermore, the CPU 110 controls the rotation mechanism 1603 so that an image displayed on the client 200 is not rotated after the control of the pan and tilt mechanisms 1601 and 1602 relative to an image displayed on the client 200 before this control.

In step S730, the CPU 110 determines whether the event that has occurred in step S701 is a reception of a completion notification. The completion notification is a notification indicating completion of control of the camera platform 155 according to a camera platform control request (control of the pan, tilt, and rotation mechanisms 1601, 1602, and 1603). If the CPU 110 determines that the event is a reception of a completion notification (YES in step S730), the processing proceeds to step S731. If the CPU 110 determines that the event is not a reception of a completion notification (NO in step S730), the processing proceeds to step S740.

In step S731, the CPU 110 causes the imaging unit 145 to resume the image capturing operation, and in step S732, the CPU 110 sets the control status data to "UNCONTROLLED". Then, the processing returns to step S701. In step S740, the CPU 110 determines whether the event that has occurred in step S701 is a reception of a video delivery stop request from the client 200. If the CPU 110 determines that the event is a reception of a video delivery stop request (YES in step S740), the processing proceeds to step S741. If the CPU 110 determines that the event is not a reception of a video delivery stop request (NO in step S740), the processing proceeds to step S790.

In step S741, the CPU 110 causes the imaging unit 145 to stop the image capturing operation, and in step S742, the CPU 110 discards the captured image data stored in the secondary storage device 130.

In step S790, the CPU 110 determines whether the event that has occurred in step S701 is an end instruction for the camera server 100. If the CPU 110 determines that the event is an end instruction (YES in step S790), the CPU 110 performs an end event.

FIG. 6 is a flowchart illustrating an operation of the client 200, which is a display control apparatus, according to the present exemplary embodiment. As the present exemplary embodiment, the operation will be described based on an example in which the CPU 210 of the client 200 performs the processing. However, for example, a part of the processing may be performed by dedicated hardware.

In step S801, the CPU 210 waits for an occurrence of an event. When an event occurs, the processing proceeds to step S810. An event that may occur this time includes an input of a video delivery request, a camera platform control request, or a video delivery stop request to the camera server 100, or a reception of captured image data (or pre-control image data) from the camera server 100.

A video delivery request, a camera platform control request, and a video delivery stop request can be input from an input unit such as the keyboard 240 and the mouse 250. Further, the client 200 can be set in such a manner that these transmission instructions are input at a preset time or according to a preset condition.

In step S810, the CPU 210 determines whether the event that has occurred in step S801 is an input of an instruction to transmit a video delivery request. If the CPU 210 determines that the event is an input of an instruction to transmit a video delivery request (YES in step S810), the processing proceeds to step S811. If the CPU 210 determines that the event is not an input of an instruction to transmit a video delivery request (NO in step S810), the processing proceeds to step S820.

Figure 7:
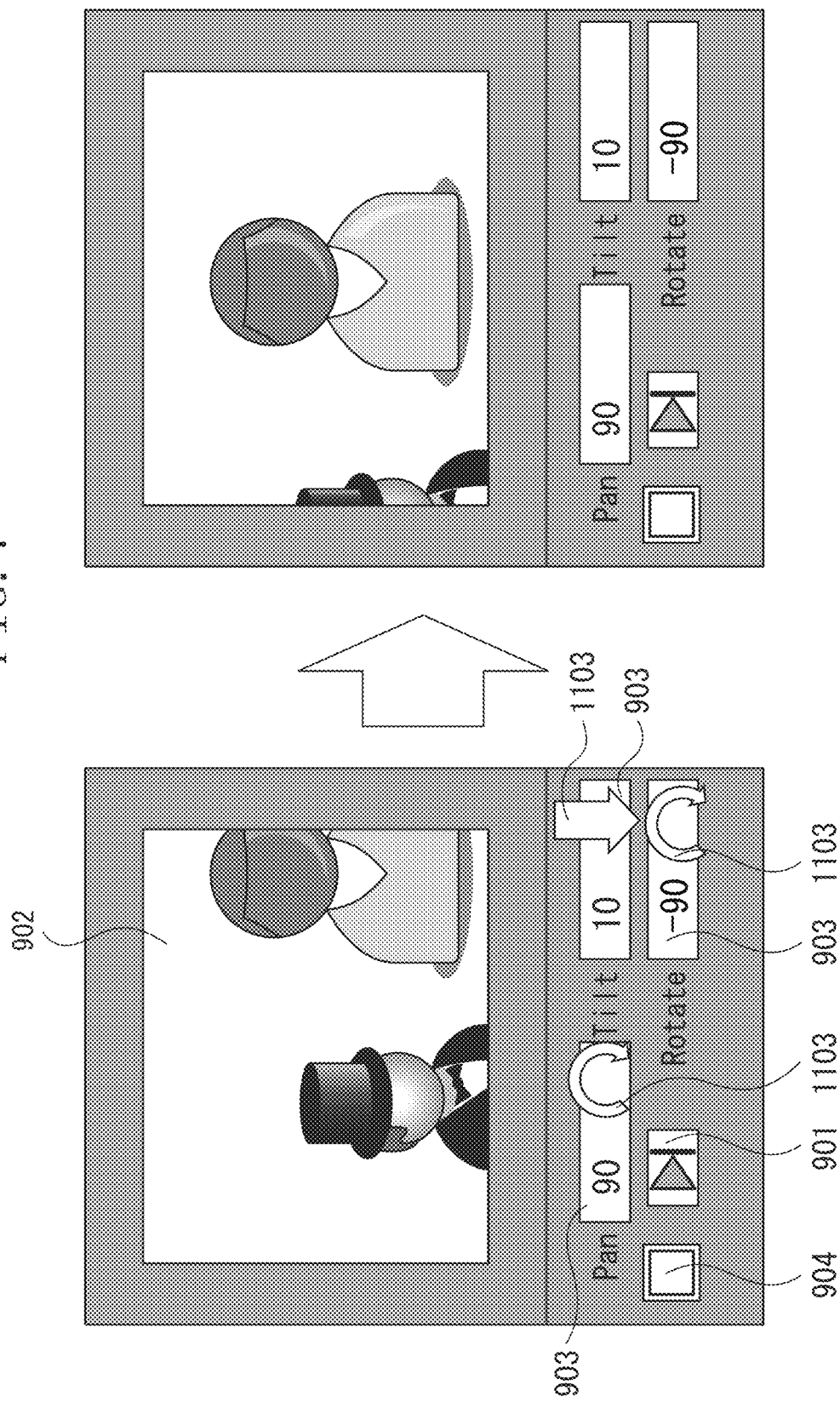
FIG. 7 illustrates an example of a user interface (UI) on the client 200.

An instruction to transmit a video delivery request to the camera server 100 is input by, for example, user's operation of a delivery request button 901 illustrated in FIG. 7 by using the keyboard 240 or the mouse 250.

In step S811, the CPU 210 transmits the video delivery request to the camera server 100, and the processing returns to step S801.

In step S820, the CPU 210 determines whether the event that has occurred in step S801 is a reception of captured image data (or pre-control image data) from the camera server 100. If the CPU 210 determines that the event is a reception of captured image data (YES in step S820), the processing proceeds to step S821. If the CPU 210 determines that the event is not a reception of captured image data (NO in step S820), the processing proceeds to step S830.

In step S821, the CPU 210 displays an image based on the captured image data as illustrated in FIG. 7 on the display 260. An area 902 illustrated in FIG. 7 is an area where an image based on captured image data is displayed. Then, in step S822, the CPU 210 transmits a video delivery request for requesting next captured image data to the camera server 100. After that, the processing returns to step S801.

In step S830, the CPU 210 determines whether the event that has occurred in step S801 is an input of an instruction to transmit a camera platform control request. The instruction to transmit a camera platform control request is input by, for example, pressing execution button (not-illustrated) after an input of at least one of a pan value, a tint value, and a rotation value in control instruction unit 903 illustrated in FIG. 7. However, an issuance of an instruction to transmit a camera platform control request is not limited thereto, and an instruction to transmit a camera platform control request may be issued by using, for example, preset control.

In this case, a user sets names and directions of the imaging unit 145 such as "entrance", "window", and "reception desk" in advance, and an input of an instruction to transmit a camera platform control request can be also realized by selecting the names. Further, an input of an instruction to transmit a camera platform control request can be also realized by dragging the mouse 250 in the area 902. Further, a user can also specify the imaging direction by inputting, for example, "10 degrees to the right" or "30 degrees downward".

If the CPU 210 determines that the event that has occurred in step S801 is an input of an instruction to transmit a camera platform control request (YES in step S830), the processing proceeds to step S831 (transmission process). In step S831, the CPU 210 transmits the camera platform control request (imaging direction movement instruction) to the camera server 100. If the CPU 210 determines that the event is not an input of an instruction to transmit a camera platform control request (NO in step S830), the processing proceeds to step S840.

In step S840, the CPU 210 determines whether the event that has occurred in step S801 is an input of an instruction to transmit a video delivery stop request. An instruction to transmit a video delivery stop request can be input by, for example, user's operation of a delivery stop button 904 illustrated in FIG. 7 by using the keyboard 240 or the mouse 250.

If the CPU 210 determines that the event that has occurred is an input of an instruction to transmit a video delivery stop request (YES in step S840), the processing proceeds to step S841. In S841, the CPU 210 transmits the video delivery stop request to the camera server 100. If the CPU 210 determines that the event is not an input of an instruction to transmit a video delivery stop request (NO in step S840), the processing proceeds to step S890.

In step S890, the CPU 210 determines whether the event that has occurred in step S801 is an end instruction to end the processing of the client 200. If the CPU 210 determines that the event is an end instruction (YES in step S890), the CPU 201 performs an end event.

The display contents on the display 260 of the client 200, when the control according to the present exemplary embodiment is performed, is described with reference to FIG. 4.

Figure 4:
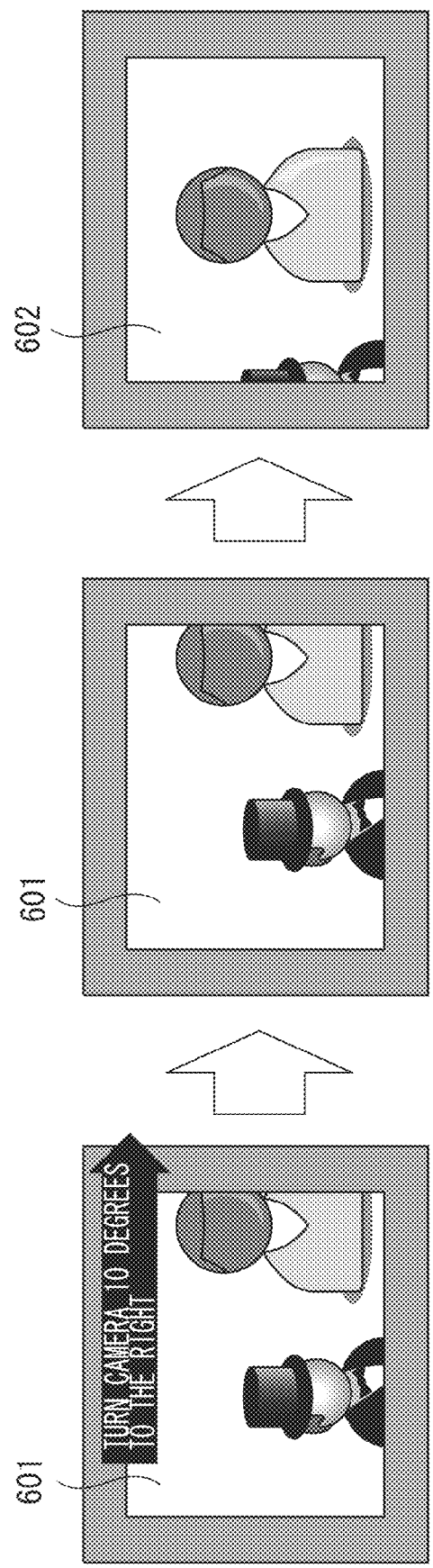
FIG. 4 illustrates an example of screens displayed on the client 200.

If a user inputs a movement instruction to move the imaging direction by 10 degrees to the right when the client 200 displays an image as illustrated on the left side of FIG. 4, the camera server 100 causes the imaging unit 145 to temporarily stop the image capturing operation, and starts to control the pan, tilt, and rotation mechanisms 1601, 1602, and 1603.

More specifically, the camera server 100 applies control including a movement by 90 degrees in pan angle, a movement by 10 degrees in tilt angle, and a movement by −90 degrees in rotation angle. If the camera server 100 receives a video delivery request from the client 200 during this control, the camera server 100 transmits pre-control image data (the image at the center of FIG. 4). The pre-control image data is captured image data generated before execution of the control according to the movement instruction (camera platform control request). Therefore, the left side and the center of FIG. 4 display the same image 601.

After that, upon completion of the control of the respective mechanisms according to the movement instruction, the camera server 100 causes the imaging unit 145 to resume the image capturing operation, and transmits the captured image data generated after the restart (the image on the right side of FIG. 4) to the client 200 in response to a reception of a video delivery request.

Controlling the camera server 100 in this way can reduce the possibility that a user may think under a misapprehension that the camera server 100 is not applying appropriate control according to the user's imaging direction movement instruction.

The present exemplary embodiment has been described based on an example in which the camera server 100 and the client 200 are connected via the network 195, but the present exemplary embodiment can be applied to an apparatus including the camera server 100 and the client 200 connected via an internal bus.

Further, the present exemplary embodiment has been described based on an example in which the camera server 100 transmits pre-control image data to the client 200 when the camera server 100 receives a video delivery request during control of the pan, tilt, and rotation mechanisms 1601, 1602, and 1603, but the present exemplary embodiment is not limited thereto. For example, the system may be configured in such a manner that the client 200 is prevented from transmitting a video delivery request to the camera server 100 while the camera server 100 is controlling the pan, tilt, and rotation mechanisms 1601, 1602, and 1603.

For example, when the client 200 transmits a movement instruction to change the imaging direction to a movement direction different from the tilt direction, the client 200 does not transmit a video delivery request until the client 200 receives a completion notification indicating completion of the control according to the movement instruction from the camera server 100.

In this case, a step of determining whether the completion notification is received (reception process) is added to the flowchart in FIG. 6 illustrating the operation of the client 200. Further, the client 200 does not display captured image data that the client 200 receives since a transmission of a movement instruction until a reception of a completion notification (display control process). In this way, it is also possible to prevent a display of captured image data during control of the pan, tilt, and rotation mechanisms 1601, 1602, and 1603 by the processing of the processing at the client 200.

Next, a second exemplary embodiment of the present invention will be described, especially centering on difference from the first exemplary embodiment.

The camera server 100 in the second exemplary embodiment transmits, to the client 200 (destination to which captured image data is transmitted), a control-in-progress notification indicating that the camera server 100 is controlling the pan, tilt, and rotation mechanisms 1601, 1602, and 1603 according to the movement instruction of the imaging direction. Then, after the reception of the control-in-progress notification, the client 200 displays, on the display 260, an indication that the imaging direction of the imaging unit 145 is being controlled.

FIG. 7 illustrates an example of the screens displayed on the client 200 according to the present exemplary embodiment. As illustrated in FIG. 7, the screen shows camera platform control indications 1103 indicating that the pan, tilt, and rotation mechanisms 1601, 1602, and 1603 are being driven, respectively.

Then, upon completion of the control of the respective mechanisms, the client 200 displays an image based on captured image data that is newly captured, and hides the display of the camera platform control indications 1103. As a result, it is possible to reduce the possibility that an unchanged display of an image based on captured image data may mislead a user to think that the imaging direction is not being moved to the direction according to the user's movement instruction.

Figure 5A:
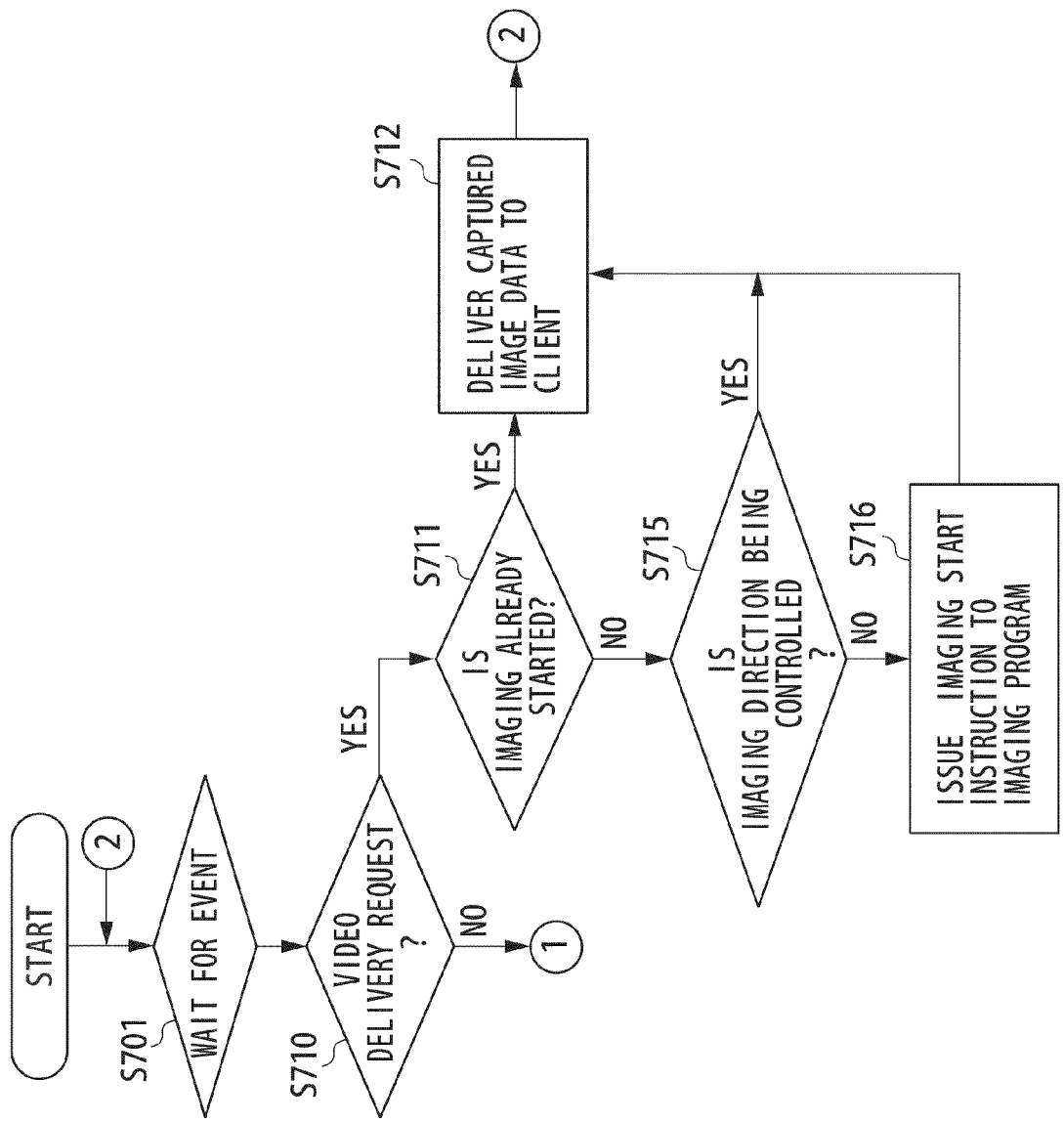
FIG. 5 (5A and 5B) is a flowchart illustrating an operation of the camera server 100.
Figure 5B:
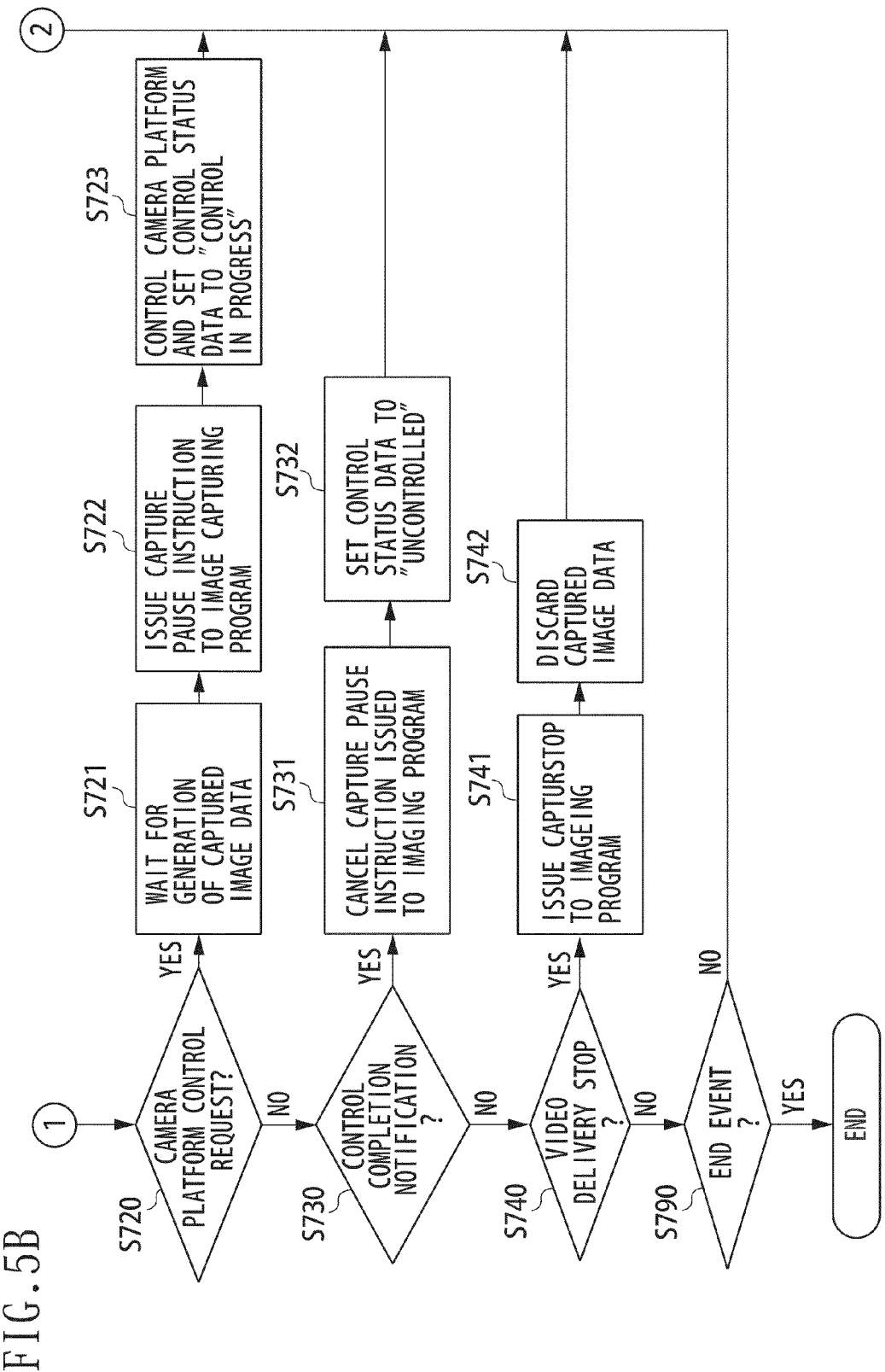

Regarding the processing of the camera server 100, steps S723 and S732 illustrated in FIG. 5 are different between the first exemplary embodiment and the second exemplary embodiment.

In step S723, the CPU 110 of the camera server 100 starts to control the camera platform 155 via the control I/F 150, and sets the control status data to "CONTROL-IN-PROGRESS". Further, the CPU 110 reads the current pan angle, tilt angle, and rotation angle from the control I/F 150, and transmits them to the client 200.

In this way, the camera server 100 in the present exemplary embodiment notifies the client 200 of the angle of each mechanism as a control-in-progress notification indicating that control is in progress, so that a user at the client 200 can check the progress situation of control of each mechanism. Alternatively, the camera server 100 may transmit, to the client 200, a control-in-progress notification without the angle of each mechanism contained therein.

In step S732, the CPU 110 sets the control status data to "UNCONTROLLED", and transmits a completion notification to the client 200. Then, the processing returns to step S701.

Regarding the processing of the client 200, step S831 illustrated in FIG. 6 is different from that in the first exemplary embodiment. Further, the processing of the client 200 in the present exemplary embodiment additionally includes step S850 (not illustrated) for determining whether the event that has occurred in step S801 is a reception of a completion notification from the camera server 100.

In step S831, the CPU 210 of the client 200 receives a control-in-progress notification including the current pan angle, tilt angle, and rotation angle from the camera server 100, after the CPU 210 transmits a camera platform control request to the camera server 100. Then, the CPU 210 displays the camera platform control indications 1103 on the display 260, as illustrated in FIG. 7.

The CPU 210 in the present exemplary embodiment calculates a difference between the target angle according to the movement instruction and the current angle received from the camera server 100 for each mechanism, and displays an icon as the camera platform control indication 1103 if the calculated difference is not zero.

In the example illustrated in FIG. 7, three camera platform control indications 1103 are displayed since the current angles of the pan, tilt, and rotation mechanisms do not reach the respective target angles.

The present exemplary embodiment has been described based on an example in which the CPU 210 of the client 200 calculates a difference between a target angle and a current angle, but the camera server 100 may calculate this difference, and transmit the result to the client 200.

Further, in step S840, if the CPU 210 determines that the event that has occurred in step S801 is not a reception of a video delivery stop request (NO in step S840), the processing proceeds to step S850. In step S850, the CPU 210 determines whether the event that has occurred in step S801 is a reception of a completion notification. If the CPU 210 determines that the event is a reception of a completion notification (YES in step S850), the CPU 210 deletes the camera platform control indications 1103 from the display 260, and then the processing returns to step S801. On the other hand, if the CPU 210 determines that the event is not a reception of a completion notification (NO in step S850), the processing proceeds to step S890.

The camera platform control indication 1103 may be expressed by, for example, an arrow indicating a driving direction, or an icon just indicating that the imaging direction is being moved. Further, the camera platform control indication 1103 is not limited to the icon illustrated in FIG. 7, and may be embodied by any indication enabling a user to know that each mechanism is being driven, such as making the input area blink or a display of an input frame.

Alternatively, the CPU 210 may display a difference between a target angle and a current angle for each mechanism. This arrangement enables a user to more accurately check the progress of the control status of each mechanism.

As described above, the camera server 100 in the present exemplary embodiment transmits, to the client 200, a drive-in-progress notification indicating that each mechanism is being driven according to the movement instruction of the imaging direction, and causes the camera platform control indication 1103 to be displayed on the display 260 of the client 200.

This arrangement can reduce the possibility that a user of the client 200 may think under a misapprehension that the imaging direction is not being appropriately controlled in response to the user's imaging direction movement instruction, even though an image based on captured image data is not changed because the camera platform control is now in progress.

The first and second exemplary embodiments have been described mainly based on an example in which pre-control image data is stored in the camera server 100, but pre-control image data may be stored in the client 200. In this case, the client 200 continues to display pre-control image data stored in the client 200 since the client 200 transmits a camera platform control request to the camera server 100 until the client 200 receives a completion notification from the camera server 100.

Next, a third exemplary embodiment of the present invention will be described, especially centering on difference from the first exemplary embodiment. The client 200 in the third exemplary embodiment can switch the display between images before and after control of the mechanisms, after the control of the mechanisms according to the movement instruction of the imaging direction.

Figure 8:
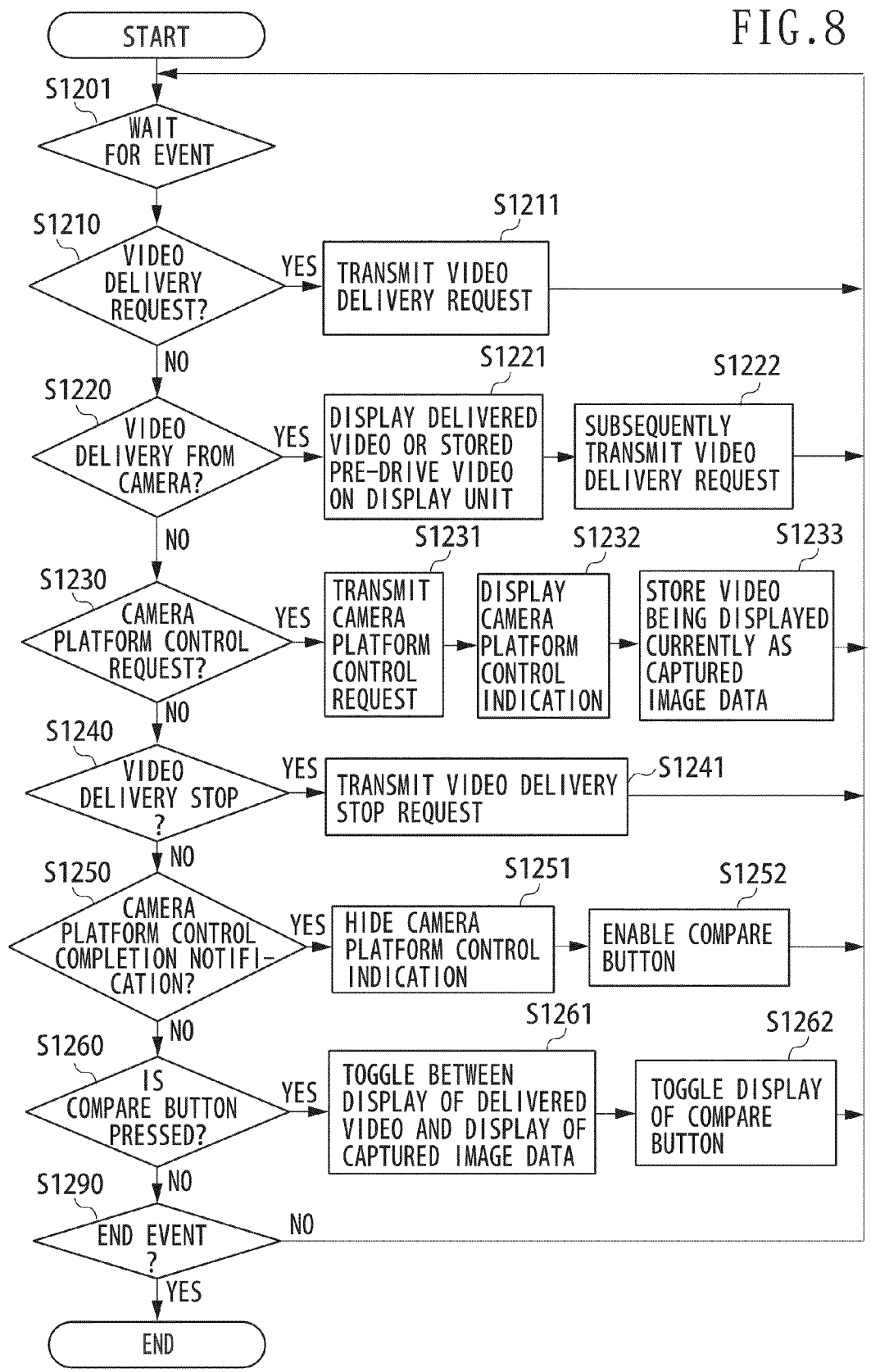
FIG. 8 is a flowchart illustrating an operation of the client 200.

FIG. 8 is a flowchart illustrating processing performed by the client 200 according to the present exemplary embodiment. As the present exemplary embodiment, the operation will be described based on an example in which the CPU 210 of the client 200 performs the processing. However, for example, a part of the processing may be performed by dedicated hardware.

Steps S1201 to S1220, S1222 to S1231, S1240, S1241, and S1290 illustrated in FIG. 8 correspond to steps S801 to S820, S822 to S831, S840, S841, and S890 illustrated in FIG. 6, respectively. Therefore, the description thereof will be omitted here.

In step S1221, the CPU 210 of the client 200 displays an image based on the captured image data received in step S1201, or an image based on pre-control image data on the display 260.

Figure 9:
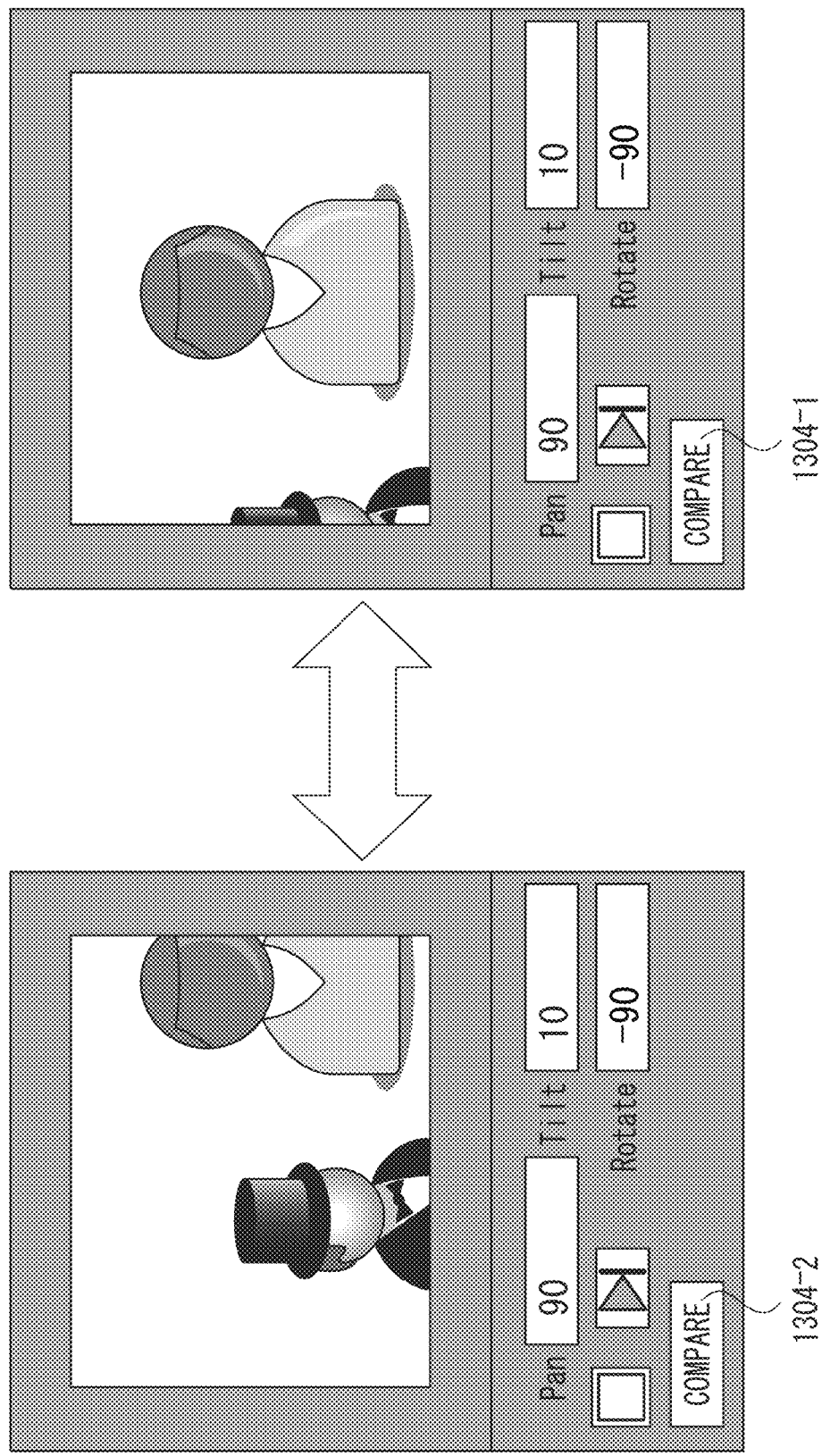
FIG. 9 illustrates an example of an UI according to a third exemplary embodiment.

FIG. 9 illustrates an example of screens displayed on the client 200 according to the present exemplary embodiment. As illustrated in FIG. 9, in the present exemplary embodiment, a comparison button 1304 is displayed.

In step S1232, the CPU 210 displays the camera platform control indication 1103. Further, in step S1233, the CPU 210 stores the captured image data corresponding to the image that is currently being displayed on the client 200, as pre-control image data in the secondary storage device 230. Then, the processing returns to step S1201.

In step S1260, the CPU 210 determines whether the event that has occurred in step S1201 is pressing of the comparison button 1304. If the CPU 210 determines that the event is pressing of the comparison button 1304 (YES in step S1260), the processing proceeds to step S1261. If the CPU 210 determines that the event is not pressing of the comparison button 1304 (NO in step S1260), the processing proceeds to step S1290.

In step S1261, the CPU 210 switches the displayed image between the image based on the pre-control image data and the image based on the captured image data that is captured after the control.

When the comparison button 1304 is in a recessed state by being pressed as a comparison button 1304-2 illustrated in FIG. 9, the client 200 displays the image based on the pre-control image data. When the comparison button 1304 is pressed after that, the comparison button 1304 turns into a protruding state as a comparison button 1304-1, and the image displayed on the client 200 is switched to the captured image data that is captured after the control.

On the other hand, if the comparison button 1304 is pressed when the comparison button 1304 is in a protruding state, the comparison button 1340 turns into a recessed state as the comparison button 1304-2, and the image displayed on the client 200 is switched from the image based on the captured image data that is captured after the control, to the image based on the pre-control image data.

As described above, the client 200 according to the present exemplary embodiment switches the image displayed thereon between an image captured before controlling the pan, tilt, and rotation mechanisms, and an image captured after controlling thereof, in response to pressing of the comparison button 1304. This arrangement enables a user to easily check whether the imaging direction is appropriately controlled in response to the user's imaging direction movement instruction, after the imaging direction is moved.

Next, a fourth exemplary embodiment of the present invention will be described, especially centering on difference from the first exemplary embodiment. The fourth exemplary embodiment processes captured image data in such a manner that an image displayed on the client 200 looks like as if the image is having a pseudo-movement to a movement direction according to a movement instruction.

The present exemplary embodiment will be described mainly based on an example in which the camera server 100 processes captured image data, but the client 200 may process captured image data.

FIG. 11 illustrates an example of screens displayed on the display 260 of the client 200 according to the present exemplary embodiment.

When a user inputs a movement instruction to change the imaging direction by 10 degrees to the right while the client 200 displays an image on the left side of FIG. 11, the captured image data is processed so that the left image in FIG. 11 looks like as if it is shifting to the right until the camera server 100 completes the control of the pan, tilt, and rotation mechanisms. As a result, the client 200 can display an image enabling a user to believe as if the imaging direction of the imaging unit 145 is moving to the right, as illustrated at the center of FIG. 11.

Then, after the completion of the movement of the imaging direction, the client 200 displays an image captured after the movement as illustrated on the right side of FIG. 11. This arrangement can reduce the possibility that a user may think under a misapprehension that the imaging direction is not being appropriately controlled in response to the user's imaging direction movement instruction.

Figure 10A:
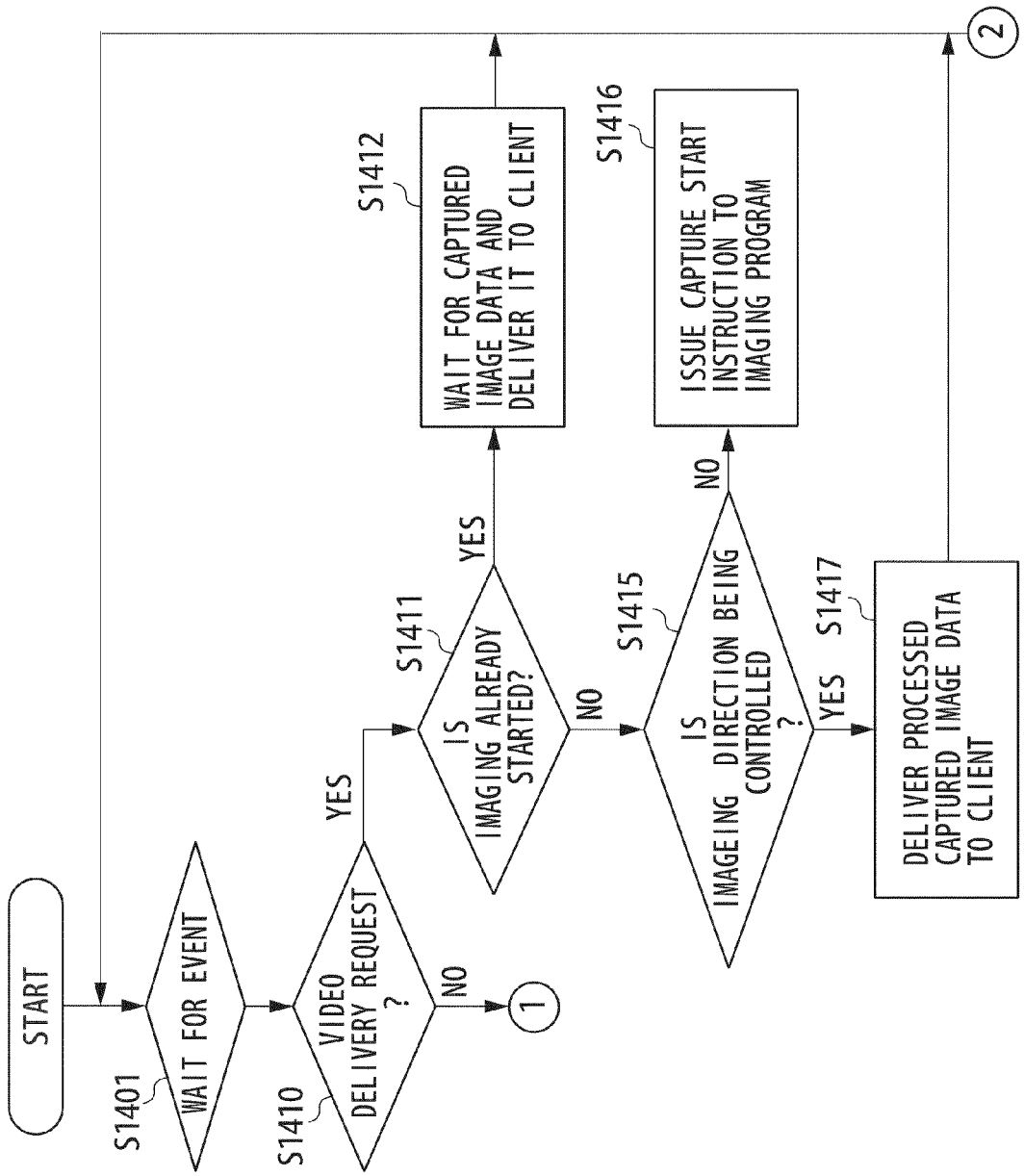
FIG. 10 is a flowchart illustrating an operation of the client 200.

The processing of the camera server 100, which is a transmission apparatus in the present exemplary embodiment, will be now described with reference to FIG. 10. Steps S1401 to S1416, S1420 to S1422, S1430 to S1432, S1440 to S1442, and S1490 in FIG. 10 correspond to steps S701 to S716, S720 to S722, S730 to S732, S740 to S742, and S790 in FIG. 5, respectively.

In step S1417, the CPU 110 transmits processed image data to the client 200. The processed image data is image data showing captured image data being shifted to a movement direction according to a movement instruction. As step S1452 will be described below, the CPU 110 generates the processed image data, when a movement direction according to an imaging direction change request (camera platform control request) does not coincide with the tilt direction.

Then, the CPU 110 transmits the generated processed image data to the client 200 upon receiving a video delivery request from the client 200 during the controlling the pan, tilt, and rotation mechanisms.

In step S1423, the CPU 110 stores the pan, tilt, and rotation angles of the imaging unit 145 before the control according to the movement instruction, starts to control the camera platform 155, and specifies "CONTROL-IN-PROGRESS" as the control status data. Then, the processing returns to step S1401.

In step S1433, the CPU 110 discards the processed image data. More specifically, the CPU 110 discards the processed image data after completion of controlling the pan, tilt, and rotation mechanisms.

In step S1450, the CPU 110 determines whether the pan, tilt, and rotation mechanisms are being controlled, and whether the CPU 110 receives a timer event. If the CPU 110 determines that the mechanisms are being controlled, and that the CPU 110 receives a timer event (YES in step S1450), the processing proceeds to step S1451. In step S1451, the CPU 110 calculates where a current position would be located on an imaginary movement line connecting the area imaged before the control and the area imaged after the control.

For example, in the example illustrated in FIG. 11, the CPU 110 calculates from the operation characteristic of the camera server 100 that it will take 10 seconds to drive all of the necessary mechanisms to move the imaging direction by 10 degrees to the right. Then, assuming that the CPU 110 receives a timer event every one second, the imaginary current position calculated in step S1451 is an angle of view shifted to the right by a distance corresponding to an elapsed time since the start of the control relative to the pan, tilt, and rotation angles before the control which are stored in camera server 100 in step S1423.

In step S1452, the CPU 110 generates processed image data by shifting the captured image data before the control according to the imaginary position calculated in step S1451 and stores thereof. In other words, the CPU 110 processes the captured image data before the control of the pan, tilt, and rotation mechanisms in such a manner that the client 200 displays the imaging direction as if the imaging direction is being changed to the movement direction according to the movement instruction.

More specifically, in the example illustrated in FIG. 11, for example, when 5 seconds has passed since a start of control (the CPU 110 receives 5 timer events), the CPU 110 generates processed image data that looks like as if the imaging direction before the control is shifted by 5 degrees to the right.

At this time, the CPU 110 generates processed image data 1501 by patching a portion that is not imaged, for example, with some texture image. The processed image data generated in step S1452 is transmitted to the client 200 in step S1417.

As described above, the camera server 100 in the present exemplary embodiment transmits processed image data that is generated by processing captured image data before control, instead of captured image data that is captured during the control according to the movement instruction of the imaging direction.

As a result, for example, when a user issues a movement instruction to move the imaging direction to the right, the client 200 displays an image as if the imaging direction is moving to the right. This arrangement can reduce the possibility that a user may think under a misapprehension that the imaging direction is not being appropriately controlled in response to the user's imaging direction movement instruction.

Next, a fifth exemplary embodiment of the present invention will be described, especially centering on difference from the first exemplary embodiment. The fifth exemplary embodiment switches whether or not the camera server 100 transmits captured image data that is captured during control of the pan, tilt, and rotation mechanisms, according to an installation mode (display control mode) of the camera server 100, which is a transmission apparatus.

More specifically, when the installation mode of the camera server 100 is a ceiling-suspended mode, the camera server 100 transmits, to the client 200, captured image data that is captured during control according to the movement instruction of the imaging direction. On the other hand, when the installation mode of the camera server 100 is a wall-hung mode, the camera server 200 does not transmit, to the client 200, captured image data that is captured during control according to the movement instruction of the imaging direction.

The ceiling-suspended mode in the present exemplary embodiment is a mode of installing the camera 100 so that the imaging surface of the imaging unit 145 is in parallel with a ceiling surface. In this case, the imaging unit 145 captures an image downward from the ceiling. In this ceiling-suspended mode, the camera server 100 does not control the rotation mechanism even if a movement direction according to the movement instruction of the imaging direction does not coincide with the tilt direction.

On the other hand, the wall-hung mode in the present exemplary embodiment is a mode of installing the camera server 100 so that the imaging surface of the imaging unit 145 is in parallel with the wall surface. In this wall-hung mode, the camera server 100 controls the rotation mechanism after controlling the pan and tilt mechanisms, if a movement direction according to the movement instruction of the imaging direction does not coincide with the tilt direction.

In other words, the ceiling-suspended mode is an installation mode in which the camera server 100 does not control the mechanism rotating the imaging unit 145 (the rotation mechanism), even if a movement direction according to the movement instruction of the imaging direction does not coincide with the tilt direction.

On the other hand, the wall-hung mode is an installation mode in which the camera server 100 controls the mechanism for rotating the imaging unit 145, if a movement direction according to the movement instruction of the imaging direction does not coincide with the tilt direction. Therefore, when the camera server 100 is in the ceiling-suspended mode, the camera server 100 controls the pan and tilt mechanisms so that the imaging direction is changed to a movement direction according to the movement instruction of the imaging direction while keeping an angle by the rotation mechanism, if the movement direction according to a movement instruction of the imaging direction does not coincide with the tilt direction.

The camera server 100 in the present exemplary embodiment has a toggle switch for setting the installation mode, in addition to the configuration illustrated in the block diagram of FIG. 1. The CPU 110 determines the installation mode of the camera server 100 based on the status of the toggle switch. However, the present exemplary embodiment is not limited to this configuration. For example, the installation mode may be set by software. Further, the installation mode may be determined by using a G sensor.

An operation of the camera server 100 in the present exemplary embodiment will be described with reference to the flowchart illustrated in FIG. 5. The CPU 110 in the present exemplary embodiment determines the installation mode (display control mode) of the camera server 100, when the camera server 100 is started up (determination process).

Then, if the CPU 110 determines that the installation mode is the ceiling-suspended mode, the CPU 110 disables steps S721, S722, and S731 illustrated in FIG. 5. In other words, if the camera server 100 is in the ceiling-suspended mode, the CPU 110 does not store pre-control image data, and does not cause the imaging unit 145 to pause its image capturing operation, even when the CPU 110 receives a camera platform control request. Therefore, if the CPU 110 receives a video delivery request when the camera server 100 is controlling the pan and tilt mechanisms in response to a movement instruction to change the imaging direction to a movement direction that is different from the tilt direction, the CPU 110 transmits captured image data that is captured during the control.

On the other hand, if the installation mode is the wall-hung mode, the CPU 110 transmits pre-control image data to the client 200 when the CPU 110 receives a video delivery request during control of the pan, tilt, and rotation mechanisms according to a movement instruction to change the imaging direction to a movement direction that is different from the tilt direction.

In the present exemplary embodiment, when the installation mode is changed during an operation of the camera server 100, the camera server 100 switches the processing according to this change. Further, in the present exemplary embodiment, when the camera server 100 is in the wall-hung mode, the camera server 100 may display a control-in-progress indication as described in the second exemplary embodiment, or transmit processed image data as described in the fourth exemplary embodiment.

As described above, the camera server 100 according to the present exemplary embodiment switches, according to the installation mode (display control mode), whether to transmit captured image data that is captured during control according to the movement instruction of the imaging direction. This arrangement can reduce the possibility that a user may think under a misapprehension that the imaging direction is not being appropriately controlled according to the user's imaging direction movement instruction. Further, this arrangement enables the client 200 to display an image more closely reflecting a real time situation.

Next, a sixth exemplary embodiment of the present invention will be described, especially centering on difference from the first exemplary embodiment.

The camera server 100 according to the present exemplary embodiment switches whether to transmit captured image data that is captured during control, according to the installation mode (display control mode) and a movement direction according to the movement instruction of the imaging direction. More specifically, when the installation mode of the camera server 100 is the wall-hung mode, and the movement direction of the imaging direction does not coincide with the tilt direction, the camera server 100 performs control so as not to transmit captured image data that is captured during the control.

More specifically, similar to the fifth exemplary embodiment, the camera server 100 according to the present exemplary embodiment determines the installation mode (display control mode) when the camera server 100 is started up. Then, if the camera server 100 determines that the installation mode is the ceiling-suspended mode, the camera server 100 transmits captured image data that is captured during control according to the movement instruction of the imaging direction.

On the other hand, if the camera server 100 determines that the installation mode is the wall-hung mode, the camera server 100 determines whether the movement direction of the imaging direction coincides with the movement direction controlled by the tilt mechanism (tilt direction), upon a reception of a camera platform control request. For example, if the camera server 100 receives a camera platform control request for moving the imaging direction by 10 degrees downward, the camera server 100 determines that the movement direction coincides with the tilt direction, and therefore transmits captured image data that is captured during the control of the tilt mechanism.

On the other hand, if the camera server 100 receives a camera platform control request for moving the imaging direction by 10 degrees to the right, the camera server 100 determines that the movement direction does not coincide with the tilt direction, and therefore perform control so as not to transmit captured image data that is captured during the control of the respective mechanisms.

In this way, when a movement direction according to the movement instruction of the imaging direction coincides with the tilt direction, the camera server 100 in the present exemplary embodiment transmits captured image data that is captured during the control according to the movement instruction. In other words, when the camera server 100 controls the tilt mechanism without controlling the pan and rotation mechanisms according to a movement instruction, the camera server 100 transmits captured image data that is captured during this control.

On the other hand, when the cameras server 100 controls the pan, tilt and rotation mechanisms according to a movement instruction, the camera server 100 does not transmit captured image data that is captured during this control.

A movement direction controlled by the pan and tilt mechanisms varies depending on the control statuses of the pan and tilt mechanisms. This means that, for example, the right direction may coincide with the tilt direction, depending on the control statuses of the pan and tilt mechanisms.

Further, the present exemplary embodiment has been described based on an example in which the camera server 100 determines the installation mode at the time of its startup. However, for example, the installation mode may be determined each time the camera server 100 receives an imaging direction movement instruction.

As mentioned above, the camera server 100 according to the sixth exemplary embodiment controls an image displayed at a transmission destination, according to a movement direction indicated by the movement instruction of the imaging direction, and the installation mode (display control mode). This arrangement can reduce the possibility that a user may think under a misapprehension that the imaging direction is not being appropriately controlled according to the user's movement instruction of the imaging direction. Further, this arrangement enables the client 200 to display an image more closely reflecting a real time situation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-142946 filed Jun. 23, 2010, which is hereby incorporated by reference herein in its entirety.

What is claimed is:

1. A transmission apparatus configured to transmit an image captured by an imaging unit, the transmission apparatus comprising:

a first control unit configured to control a first direction change mechanism for changing a first moving direction of the imaging unit, a second direction change mechanism for changing a second moving direction of the imaging unit, and a rotation mechanism for rotating the imaging unit, according to an instruction to change an imaging direction of the imaging unit; and a second control unit configured to restrict transmitting, to a transmission destination apparatus, an image captured by the imaging unit during rotation of the imaging direction if the first control unit makes the first and second direction change mechanisms change the imaging direction of the imaging unit and makes the rotation mechanism rotate the imaging unit according to the instruction, and to transmit the image captured by the imaging unit during changing the imaging direction of the imaging unit if the first control unit makes the first direction change mechanism change the first moving direction but does not make the second direction change mechanism change the second moving direction and the rotation mechanism rotate the imaging unit according to the instruction.

2. The transmission apparatus according to claim 1, wherein the second control unit performs the control so that the imaging unit does not capture an image during changing the imaging direction of the imaging unit.

3. The transmission apparatus according to claim 1, wherein the second control unit performs the control to prevent transmission of captured image data captured by the imaging unit during changing the imaging direction of the imaging unit.

4. The transmission apparatus according to claim 1, wherein the second control unit transmits, to the transmission destination apparatus, a control-in-progress notification indicating that the first control unit is performing the control to change the imaging direction of the imaging unit.

5. The transmission apparatus according to claim 1, further comprising:
   a storage control unit configured to store, in a memory, an image captured before the imaging direction is changed; and
   a receiving unit configured to receive a request for captured image data,
   wherein the second control unit transmits the image captured before the imaging direction is changed if the receiving unit receives the request for the captured image data while the imaging direction is changed.

6. The transmission apparatus according to claim 1, further comprising:
   a receiving unit configured to receive the instruction to change the imaging direction of the imaging unit from the transmission destination apparatus; and
   a processing unit configured to process the image captured before the imaging direction is changed according to the instruction to change the imaging direction of the imaging unit to cause the transmission destination apparatus to perform a display as if the imaging direction is being changed to the imaging direction according to the instruction,
   wherein the second control unit transmits processed image data processed by the processing unit.

7. A display control apparatus configured to display an image based on image data captured by an imaging unit and received from a transmission apparatus configured to control first and second direction change mechanisms configured to change a moving direction of the imaging unit, and to control a rotation mechanism for rotating the imaging unit, according to an instruction to change an imaging direction of the imaging unit, the display control apparatus comprising:
   a transmission unit configured to transmit the instruction to change imaging direction of the imaging unit;
   a receiving unit configured to receive the captured image data from the transmission apparatus, and receive a completion notification indicating that control according the instruction is completed;
   a display control unit configured to prevent a display of the image captured by the imaging unit since a first timing according to the transmission of the instruction to change the imaging direction of the imaging unit until a second timing according to the reception of the completion notification; and
   a storage control unit configured to store the captured image data before the control according to movement instruction in a memory,
   wherein the display control unit displays the image based on the captured image data stored in the memory since the transmission of the movement instruction until the reception of the completion notification of the movement according to the movement instruction, regardless of a reception of the captured image data from the transmission apparatus, if the rotation mechanism is controlled for changing the imaging direction of the imaging unit.

8. The display control apparatus according to claim 7, further comprising a transmission control unit configured to prevent the transmission unit from transmitting a request for the captured image data to the transmission apparatus since the transmission of the instruction to the transmission apparatus until the reception of the completion notification of the movement according to the instruction if the rotation mechanism is controlled for changing the imaging direction of the imaging unit.

9. The display control apparatus according to claim 7,
   wherein the receiving unit receives a control-in-progress notification indicating that the first control unit is performing the control according to movement direction, and
   wherein the display control unit displays, on a display screen, an indication that the control is in progress according to the control-in-progress notification.

10. The display control apparatus according to claim 7, further comprising a switch unit configured to switch a display between the image captured before the imaging direction is changed, and an image captured after the imaging direction is changed.

11. A transmission method for a transmission apparatus configured to transmit an image captured by an imaging unit, the transmission method comprising:
    controlling a first direction change mechanism for changing a first moving direction of the imaging unit, a second direction change mechanism for changing a second moving direction of the imaging unit, and a rotation mechanism for rotating the imaging unit, according to an instruction to change an imaging direction of the imaging unit; and
    restricting transmitting, to a transmission destination apparatus, an image captured by the imaging unit during rotation of the imaging direction if, according to the instruction, controlling includes making the first and second direction change mechanisms change the imaging direction of the imaging unit and making the rotation mechanism rotate the imaging unit, and transmitting the image captured by the imaging unit during changing the imaging direction of the imaging unit if, according to the instruction, controlling includes making the first direction change mechanism change the first moving direction but does not include making the second direction change mechanism change the second moving direction and the rotation mechanism rotate the imaging unit.

12. A non-transitory computer readable storage medium storing a program to cause a transmission apparatus, configured to transmit an image captured by an imaging unit, to perform a transmission method, the transmission method comprising:
    controlling a first direction change mechanism for changing a first moving direction of the imaging unit, a second direction change mechanism for changing a second moving direction of the imaging unit, and a rotation mechanism for rotating the imaging unit, according to an instruction to change an imaging direction of the imaging unit; and
    restricting transmitting, to a transmission destination apparatus, an image captured by the imaging unit during rotation of the imaging direction if, according to the instruction, controlling includes making the first and second direction change mechanisms change the imaging direction of the imaging unit and making the rotation mechanism rotate the imaging unit, and transmitting the image captured by the imaging unit during changing the imaging direction of the imaging unit if, according to the instruction, controlling includes making the first direction change mechanism change the first moving direction but does not include making the second direction change mechanism change the second moving direction and the rotation mechanism rotate the imaging unit.

13. A display control method performed by a display control apparatus configured to display an image based on image data captured by an imaging unit and received from a transmission apparatus configured to control first and second direction change mechanisms configured to change a moving direction of the imaging unit, and control a rotation mechanism for rotating the imaging unit, according to an instruction to change an imaging direction of the imaging unit, the display control method comprising:

transmitting the instruction to change the imaging direction of the imaging unit;
  receiving the captured image data from the transmission apparatus, and receive a completion notification indicating that control according the instruction is completed;
  preventing a display of the image captured by the imaging unit since a first timing according to the transmission of the instruction to change the imaging direction of the imaging unit until a second timing according to the reception of the completion notification; and
  storing the captured image data before the control according to movement instruction in a memory,
  wherein preventing the display of the image includes displaying the image based on the captured image data stored in the memory since the transmission of the movement instruction until the reception of the completion notification of the movement according to the movement instruction, regardless of a reception of the captured image data from the transmission apparatus, if the rotation mechanism is controlled for changing the imaging direction of the imaging unit.

14. A non-transitory computer readable storage medium storing a program to cause a display control apparatus to perform a display control method, wherein the display control apparatus is configured to display an image based on image data captured by an imaging unit and received from a transmission apparatus configured to control first and second direction change mechanisms configured to change a moving direction of the imaging unit, and control a rotation mechanism for rotating the imaging unit, according to an instruction to change an imaging direction of the imaging unit, the display control method comprising:

transmitting the instruction to change the imaging direction of the imaging unit;
  receiving the captured image data from the transmission apparatus, and receive a completion notification indicating that control according the instruction is completed;
  preventing a display of the image captured by the imaging unit since a first timing according to the transmission of the instruction to change the imaging direction of the imaging unit until a second timing according to the reception of the completion notification; and
  storing the captured image data before the control according to movement instruction in a memory,
  wherein preventing the display of the image includes displaying the image based on the captured image data stored in the memory since the transmission of the movement instruction until the reception of the completion notification of the movement according to the movement instruction, regardless of a reception of the captured image data from the transmission apparatus, if the rotation mechanism is controlled for changing the imaging direction of the imaging unit.

15. The transmission apparatus according to claim 1, further comprising:
  a storage control unit configured to store, in a memory, the image captured before the imaging direction is changed; and
  a receiving unit configured to receive a request for the captured image,
  wherein, if the determination unit determines that the imaging direction of the imaging unit is changed by controlling the rotation mechanism, the second control unit controls the transmission destination apparatus to display the image captured before the imaging direction is changed and stored in the memory.

16. The transmission method according to claim 11, further comprising:
  storing, in a memory, the image captured before the imaging direction is changed; and
  receiving a request for the captured image,
  wherein, if it is determined that the imaging direction of the imaging unit is changed by controlling the rotation mechanism, preventing the display of the image includes controlling the transmission destination apparatus to display the image captured before the imaging direction is changed and stored in the memory.

17. The non-transitory computer readable storage medium according to claim 12, the transmission method further comprising
  storing, in a memory, the image captured before the imaging direction is changed; and
  receiving a request for the captured image,
  wherein, if it is determined that the imaging direction of the imaging unit is changed by controlling the rotation mechanism, preventing the display of the image includes controlling the transmission destination apparatus to display the image captured before the imaging direction is changed and stored in the memory.

18. The display control method according to claim 13, further comprising:
  storing the image captured before the imaging direction is changed; and
  displaying the image stored in the memory since the transmission of the movement instruction until the reception of the completion notification of the movement if it is determined that the imaging direction of the imaging unit is changed without controlling the rotation mechanism, regardless of a reception of the captured image data from the transmission apparatus.

19. The non-transitory computer readable storage medium according to claim 14, the display control method further comprising:
  storing the image captured before the imaging direction is changed; and
  displaying the image stored in the memory since the transmission of the movement instruction until the reception of the completion notification of the movement if it is determined that the imaging direction of the imaging unit is changed without controlling the rotation mechanism, regardless of a reception of the captured image data from the transmission apparatus.

* * * * *